United States Patent
Patel et al.

(10) Patent No.: US 10,425,973 B2
(45) Date of Patent: Sep. 24, 2019

(54) RANDOM ACCESS CHANNEL SIGNALING ON A SHARED COMMUNICATION MEDIUM

(71) Applicant: QUALCOMM Incorporated, San Diego, CA (US)

(72) Inventors: Chirag Sureshbhai Patel, San Diego, CA (US); Tao Luo, San Diego, CA (US); Chih-Hao Liu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 74 days.

(21) Appl. No.: 15/358,745

(22) Filed: Nov. 22, 2016

(65) Prior Publication Data

US 2017/0150523 A1    May 25, 2017

Related U.S. Application Data

(60) Provisional application No. 62/259,774, filed on Nov. 25, 2015.

(51) Int. Cl.
*H04W 74/08*        (2009.01)
*H04B 7/26*         (2006.01)
(Continued)

(52) U.S. Cl.
CPC ............ *H04W 74/085* (2013.01); *H04B 7/26* (2013.01); *H04L 5/0048* (2013.01); *H04L 5/14* (2013.01);
(Continued)

(58) Field of Classification Search
CPC . H04W 74/085; H04W 74/008; H04W 52/16; H04W 48/10; H04W 74/0816;
(Continued)

(56) References Cited

U.S. PATENT DOCUMENTS 9,820,244 B2 * 11/2017 Earnshaw ............. G01S 5/0063
2007/0270102 A1 * 11/2007 Zhu ....................... H04W 48/10
                                                   455/69

(Continued)

FOREIGN PATENT DOCUMENTS

| EP | 3131343 A1 | 2/2017 |
| WO | 2013126858 A1 | 8/2013 |
| WO | 2015165031 A1 | 11/2015 |

OTHER PUBLICATIONS

"3rd Generation Partnership Project; Technical Specification Group Radio Access Network; Evolved Universal Terrestrial Radio Access (EUTRA); Physical channels and modulation (Release 12)", 3GPP Standard; 3GPP TS 36.211, 3rd Generation Partnership Project (3GPP), Mobile Competence Centre; 650, Route Des Lucioles; F-06921 Sophia-Antipolis Cedex; France, vol. RAN WG1, No. V12.7.0, Sep. 22, 2015 (Sep. 22, 2015), pp. 1-136, KP050996213, [retrieved on Sep. 22, 2015].

(Continued)

*Primary Examiner* — Peter P Chau
(74) *Attorney, Agent, or Firm* — Muncy, Geissler, Olds & Lowe, P.C.

(57) ABSTRACT

Techniques for random access channel signaling on a shared communication medium are disclosed. A broadcast message including information associated with a Physical Random Access Channel (PRACH) may be transmitted and received on one or more subframes in a portion configured for downlink signaling. The broadcast message may comprise a contention type indicator, a timing advance indicator, or a combination thereof. The contention type indicator may indicate whether contention is in effect for transmission on the PRACH. The timing advance indicator may indicate whether an uplink transmission offset is in effect for transmission on the PRACH. Signaling over the PRACH may be (Continued)

transmitted and received on one or more subframes in a portion configured for uplink signaling.

41 Claims, 17 Drawing Sheets

(51) Int. Cl.
*H04L 5/00* (2006.01)
*H04L 5/14* (2006.01)
*H04W 48/10* (2009.01)
*H04W 52/16* (2009.01)
*H04W 74/00* (2009.01)
*H04W 84/12* (2009.01)
*H04W 16/14* (2009.01)

(52) U.S. Cl.
CPC ........... *H04W 48/10* (2013.01); *H04W 52/16* (2013.01); *H04W 74/008* (2013.01); *H04W 16/14* (2013.01); *H04W 74/006* (2013.01); *H04W 74/0816* (2013.01); *H04W 74/0833* (2013.01); *H04W 84/12* (2013.01)

(58) Field of Classification Search
CPC ........... H04W 74/0833; H04W 74/006; H04W 84/12; H04W 16/14; H04L 5/14; H04L 5/0048; H04B 7/26
See application file for complete search history.

(56) References Cited

U.S. PATENT DOCUMENTS

| | | | |
|---|---|---|---|
| 2010/0067470 A1* | 3/2010 | Damnjanovic | H04L 5/0053 370/329 |
| 2011/0171949 A1* | 7/2011 | Liao | H04W 56/0045 455/422.1 |
| 2011/0191187 A1* | 8/2011 | Charbit | G06Q 30/0241 705/14.64 |
| 2014/0086176 A1* | 3/2014 | Liu | H04W 74/006 370/329 |
| 2015/0181624 A1* | 6/2015 | Hwang | H04L 5/0053 370/329 |
| 2015/0289292 A1* | 10/2015 | Sun | H04W 74/0833 370/329 |
| 2016/0183299 A1* | 6/2016 | Fang | H04W 74/04 370/329 |
| 2016/0360422 A1* | 12/2016 | Zhang | H04W 16/14 |
| 2017/0164410 A1* | 6/2017 | Takeda | H04W 28/16 |
| 2017/0171825 A1* | 6/2017 | Takeda | H04W 52/38 |
| 2018/0042050 A1* | 2/2018 | Kim | H04W 88/08 |

OTHER PUBLICATIONS

International Search Report and Written Opinion—PCT/US2016/063529—ISA/EPO—dated Feb. 27, 2017.

* cited by examiner

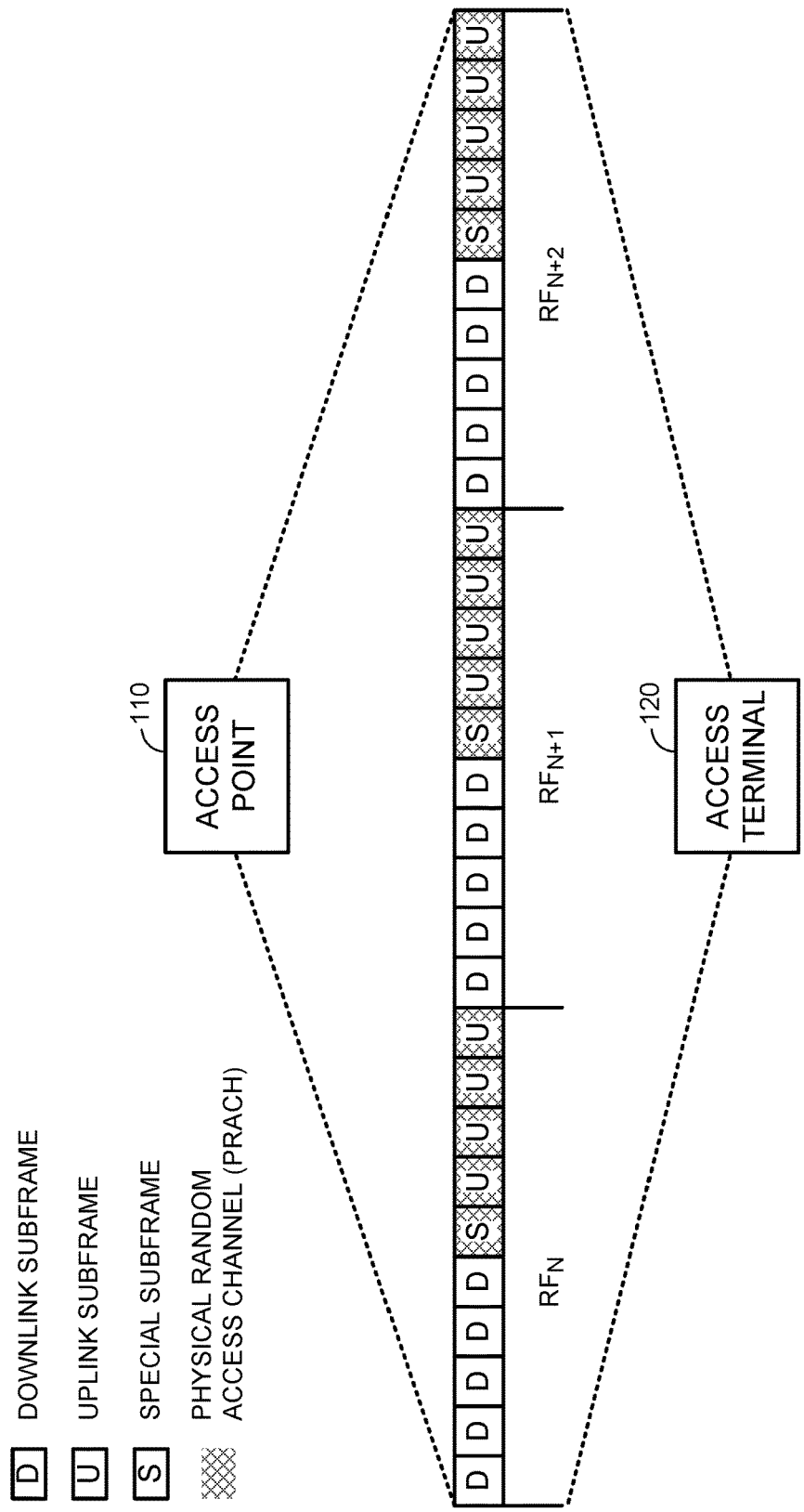

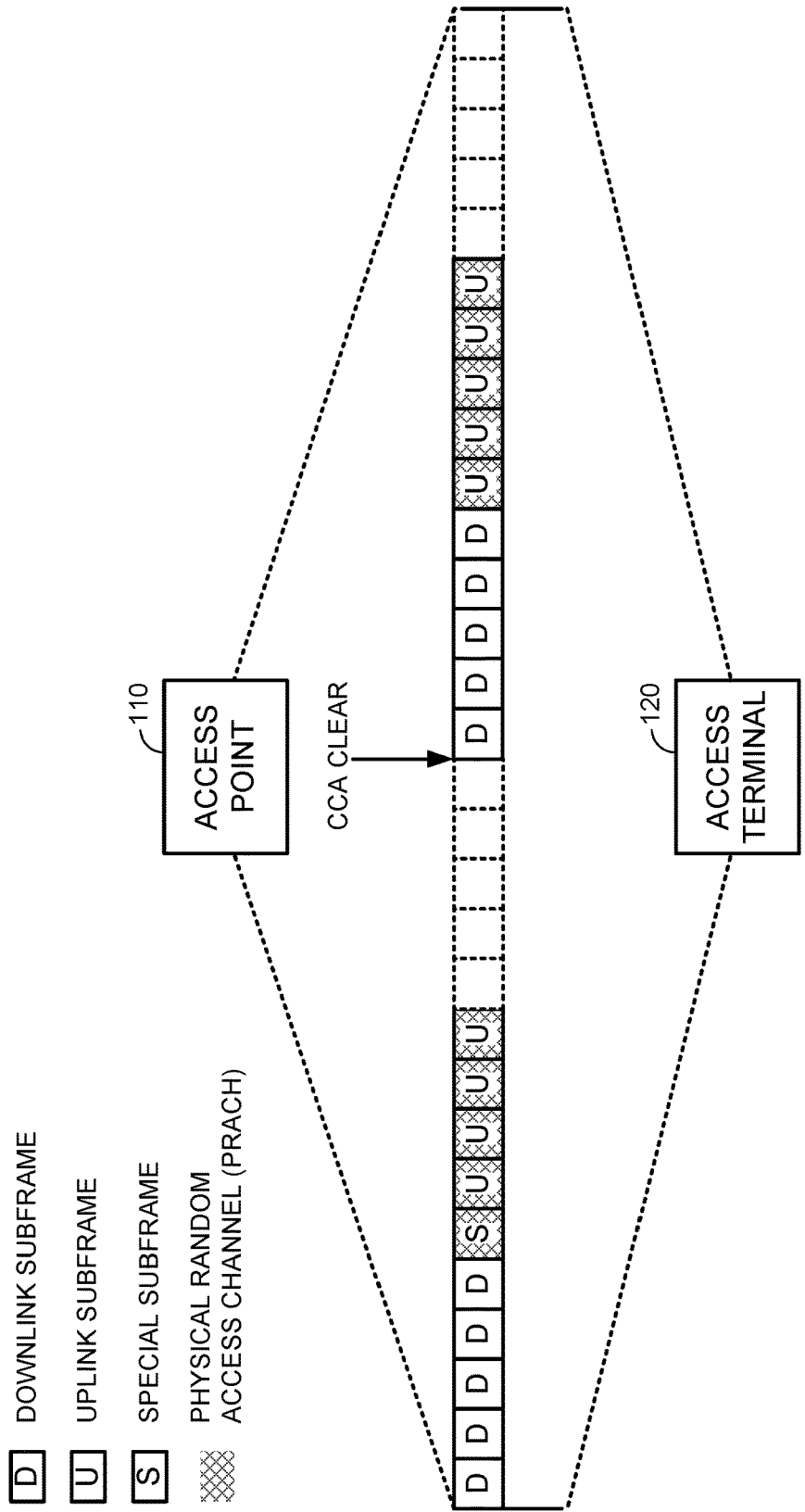

RANDOM ACCESS CHANNEL SIGNALING ON A SHARED COMMUNICATION MEDIUM

CROSS-REFERENCE TO RELATED APPLICATIONS

The present application claims the benefit of U.S. Provisional Application No. 62/259,774, entitled "Random Access Channel Signaling on a Shared Communication Medium," filed Nov. 25, 2015, assigned to the assignee hereof and expressly incorporated herein by reference in its entirety.

BACKGROUND

Aspects of this disclosure relate generally to telecommunications, and more particularly to operations on a shared communication medium and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may need to coexist with the operations of other Radio Access Technologies (RATs) that typically utilize the same unlicensed bands, most notably IEEE 802.11x WLAN technologies generally referred to as "Wi-Fi."

SUMMARY

The following summary is an overview provided solely to aid in the description of various aspects of the disclosure and is provided solely for illustration of the aspects and not limitation thereof.

In one example, a communication method is disclosed. The method may include, for example, receiving a broadcast message including information associated with a Physical Random Access Channel (PRACH) on one or more subframes in a portion configured for downlink signaling, wherein the broadcast message comprises a contention type indicator, a timing advance indicator, or a combination thereof; determining whether contention is in effect for transmission on the PRACH based on the contention type indicator, whether an uplink transmission offset is in effect for transmission on the PRACH based on the timing advance indicator, or a combination thereof; and transmitting signaling over the PRACH on one or more subframes in a portion configured for uplink signaling based on the determining.

In another example, a communication apparatus is disclosed. The apparatus may include, for example, at least one processor, at least one memory coupled to the at least one processor, and at least one transceiver. The at least one transceiver may be configured to receive a broadcast message including information associated with a PRACH on one or more subframes in a portion configured for downlink signaling. The broadcast message may comprise a contention type indicator, a timing advance indicator, or a combination thereof. The at least one processor and the at least one memory may be configured to determine whether contention is in effect for transmission on the PRACH based on the contention type indicator, whether an uplink transmission offset is in effect for transmission on the PRACH based on the timing advance indicator, or a combination thereof. The at least one transceiver may be further configured to transmit signaling over the PRACH on one or more subframes in a portion configured for uplink signaling based on the determining.

In another example, another communication apparatus is disclosed. The apparatus may include, for example, means for receiving a broadcast message including information associated with a PRACH on one or more subframes in a portion configured for downlink signaling, wherein the broadcast message comprises a contention type indicator, a timing advance indicator, or a combination thereof means for determining whether contention is in effect for transmission on the PRACH based on the contention type indicator, whether an uplink transmission offset is in effect for transmission on the PRACH based on the timing advance indicator, or a combination thereof and means for transmitting signaling over the PRACH on one or more subframes in a portion configured for uplink signaling based on the determining.

In another example, a transitory or non-transitory computer-readable medium is disclosed, which, when executed by at least one processor, causes the at least one processor to perform operations for communication. The computer-readable medium may include, for example, code for receiving a broadcast message including information associated with a PRACH on one or more subframes in a portion configured for downlink signaling, wherein the broadcast message comprises a contention type indicator, a timing advance indicator, or a combination thereof code for determining whether contention is in effect for transmission on the PRACH based on the contention type indicator, whether an uplink transmission offset is in effect for transmission on the PRACH based on the timing advance indicator, or a combination thereof and code for transmitting signaling over the PRACH on one or more subframes in a portion configured for uplink signaling based on the determining.

In one example, another communication method is disclosed. The method may include, for example, setting a contention type indicator to indicate whether contention is in effect for transmission on a PRACH, a timing advance indicator to indicate whether an uplink transmission offset is in effect for transmission on the PRACH, or a combination thereof transmitting a broadcast message associated with the PRACH on one or more subframes in a portion configured for downlink signaling, wherein the broadcast message comprises the contention type indicator, the timing advance indicator, or a combination thereof, and receiving signaling over the PRACH on one or more subframes in a portion configured for uplink signaling.

In another example, another communication apparatus is disclosed. The apparatus may include, for example, at least one processor, at least one memory coupled to the at least one processor, and at least one transceiver. The at least one processor and the at least one memory may be configured to set a contention type indicator to indicate whether contention is in effect for transmission on a PRACH, a timing advance indicator to indicate whether an uplink transmission offset is in effect for transmission on the PRACH, or a combination thereof. The at least one transceiver may be configured to transmit a broadcast message associated with the PRACH on one or more subframes in a portion configured for downlink signaling, with the broadcast message comprising the contention type indicator, the timing advance indicator, or a combination thereof, and to receive signaling over the PRACH on one or more subframes in a portion configured for uplink signaling.

In another example, another communication apparatus is disclosed. The apparatus may include, for example, means for setting a contention type indicator to indicate whether contention is in effect for transmission on a PRACH, a timing advance indicator to indicate whether an uplink transmission offset is in effect for transmission on the PRACH, or a combination thereof; means for transmitting a broadcast message associated with the PRACH on one or more subframes in a portion configured for downlink signaling, wherein the broadcast message comprises the contention type indicator, the timing advance indicator, or a combination thereof; and means for receiving signaling over the PRACH on one or more subframes in a portion configured for uplink signaling.

In another example, another transitory or non-transitory computer-readable medium is disclosed, which, when executed by at least one processor, causes the at least one processor to perform operations for communication. The computer-readable medium may include, for example, code for setting a contention type indicator to indicate whether contention is in effect for transmission on a PRACH, a timing advance indicator to indicate whether an uplink transmission offset is in effect for transmission on the PRACH, or a combination thereof; code for transmitting a broadcast message associated with the PRACH on one or more subframes in a portion configured for downlink signaling, wherein the broadcast message comprises the contention type indicator, the timing advance indicator, or a combination thereof and code for receiving signaling over the PRACH on one or more subframes in a portion configured for uplink signaling.

BRIEF DESCRIPTION OF THE DRAWINGS

The accompanying drawings are presented to aid in the description of various aspects of the disclosure and are provided solely for illustration of the aspects and not limitation thereof.

FIGS. 2A-2B illustrate an example Time Division Duplex (TDD) frame structure.

DETAILED DESCRIPTION

The present disclosure relates generally to managing random access channel signaling on a shared communication medium. To better harmonize with various contention procedures that may or may not be implemented on such a shared communication medium, one or more subframes designated to carry uplink information (e.g., uplink or special subframes) may be configured to provide enhanced parameter information for a Physical Random Access Channel (PRACH), such as a contention type indicator, a timing advance indicator, and other parameter information. The PRACH may be configured with a short or long format in the time domain across a set or subset of symbol periods and may be interlaced across a set of subcarriers, in particular, resource blocks in the frequency domain. In some designs, one or more symbol periods may be reserved for opportunistic transmission following blocked access to the communication medium, rather than directly allocated to any access terminals. Various associated random access procedures are provided as well to harmonize with the PRACH, including, for example, transmitter and receiver processing, power control, random access temporary identifiers, and retransmission control.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
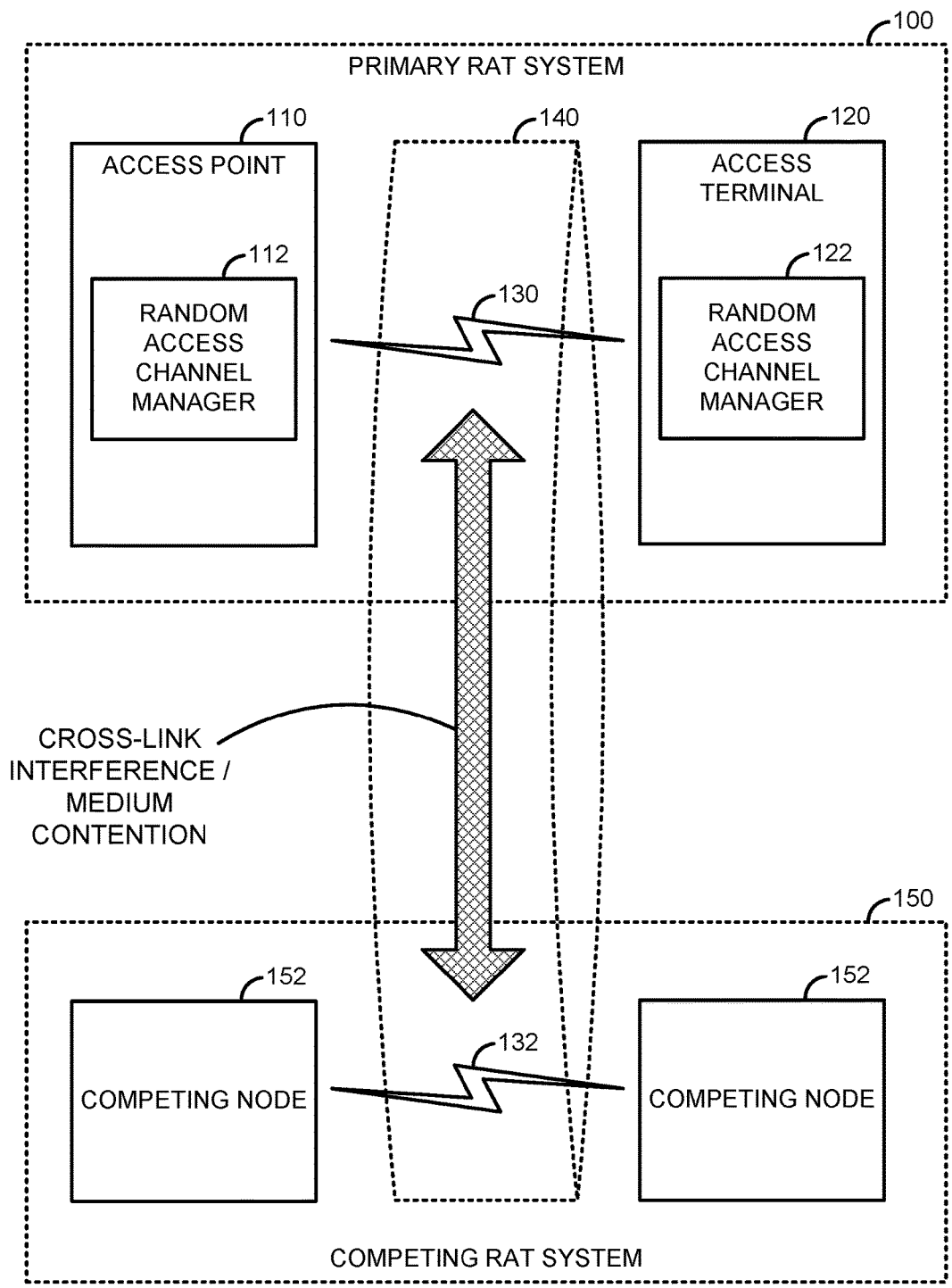
FIG. 1 is a system-level diagram illustrating an example wireless network environment.

FIG. 1 is a system-level diagram illustrating an example wireless network environment, shown by way of example as including a "primary" Radio Access Technology (RAT) system 100 and a "competing" RAT system 150. Each system may be composed of different wireless nodes generally capable of receiving and/or transmitting over a wireless link, including information related to various types of communication (e.g., voice, data, multimedia services, associated control signaling, etc.). The primary RAT system 100 is shown as including an access point 110 and an access terminal 120 in communication with each other over a wireless link 130. The competing RAT system 150 is shown as including two competing nodes 152 in communication with each other over a separate wireless link 132, and may similarly include one or more access points, access terminals, or other types of wireless nodes. As an example, the access point 110 and the access terminal 120 of the primary RAT system 100 may communicate via the wireless link 130 in accordance with Long Term Evolution (LTE) technology or a variant thereof (e.g., MuLTEfire, Licensed Assisted Access (LAA), etc.), while the competing nodes 152 of the competing RAT system 150 may communicate via the wireless link 132 in accordance with Wi-Fi technology. It will be appreciated that each system may support any number of wireless nodes distributed throughout a geographic region, with the illustrated entities being shown for illustration purposes only.

Unless otherwise noted, the terms "access terminal" and "access point" are not intended to be specific or limited to any particular RAT. In general, access terminals may be any wireless communication device allowing a user to communicate over a communications network (e.g., a mobile phone, router, personal computer, server, entertainment device, Internet of Things (JOT)/Internet of Everything (JOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. Such an access point may correspond to a small cell access point, for example. "Small cells" generally refer to a class of low-powered access points that may include or be otherwise referred to as femto cells, pico cells, micro cells, Wireless Local Area Network (WLAN) access points, other small coverage area access points, etc. Small cells may be deployed to supplement macro cell coverage, which may cover a few blocks within a neighborhood or several square miles in a rural environment, thereby leading to improved signaling, incremental capacity growth, richer user experience, and so on.

Returning to FIG. 1, the wireless link 130 used by the primary RAT system 100 and the wireless link 132 used by the competing RAT system 150 may operate over a shared communication medium 140. A communication medium of this type may be composed of one or more frequency, time, and/or space communication resources (e.g., encompassing one or more channels across one or more carriers). As an example, the communication medium 140 may correspond to at least a portion of an unlicensed frequency band. Although different licensed frequency bands have been reserved for certain communications (e.g., by a government entity such as the Federal Communications Commission (FCC) in the United States), some systems, in particular those employing small cell access points, have extended operation into unlicensed frequency bands such as the Unlicensed National Information Infrastructure (U-NII) band used by WLAN technologies including Wi-Fi.

Due to the shared use of the communication medium 140, there is the potential for cross-link interference between the wireless link 130 and the wireless link 132. Further, some RATs and some jurisdictions may require contention or "Listen Before Talk (LBT)" for access to the communication medium 140. As an example, a Clear Channel Assessment (CCA) protocol may be used in which each device verifies via medium sensing the absence of other traffic on a shared communication medium before seizing (and in some cases reserving) the communication medium for its own transmissions. In some designs, the CCA protocol may include distinct CCA Preamble Detection (CCA-PD) and CCA Energy Detection (CCA-ED) mechanisms for yielding the communication medium to intra-RAT and inter-RAT traffic, respectively. The European Telecommunications Standards Institute (ETSI), for example, mandates contention for all devices regardless of their RAT on certain communication media such as unlicensed frequency bands.

As will be described in more detail below, the access point 110 and/or the access terminal 120 may be variously configured in accordance with the teachings herein to provide or otherwise support the random access channel signaling techniques discussed briefly above. For example, the access point 110 may include a random access channel manager 112 and the access terminal 120 may include a random access channel manager 122. The random access channel manager 112 and/or the random access channel manager 122 may be configured in different ways to manage the configuration of random access channels on the communication medium 140.

FIGS. 2A-2B illustrate an example Time Division Duplex (TDD) frame structure that may be implemented for the primary RAT system 100 on the communication medium 140 to facilitate access to the communication medium 140.

The illustrated frame structure includes a series of radio frames (RFs) that may be numbered in accordance with a system frame number numerology ($RF_N$, $RF_{N+1}$, $RF_{N+2}$, etc.) and divided into respective subframes (SFs), which may also be numbered for reference (e.g., SF0, SF1, etc.). Each respective subframe may be further divided into slots (not shown in FIGS. 2A-2B), and the slots may be further divided into symbol periods. As an example, the LTE frame structure includes system frames that are divided into 1024 numbered radio frames composed of 10 subframes each, which together constitute a system frame cycle (e.g., lasting 10.24 s for 10 ms radio frames having 1 ms subframes). Moreover, each subframe may comprise two slots, and each slot may comprise six or seven symbol periods. The use of a frame structure may provide more natural and efficient coordination among devices than more ad hoc signaling techniques.

The example frame structure of FIGS. 2A-2B is TDD in that each subframe may be variously operated at different times as a downlink (D), uplink (U), or special (S) subframe. In general, downlink subframes are reserved for transmitting downlink information from the access point 110 to the access terminal 120, uplink subframes are reserved for transmitting uplink information from the access terminal 120 to the access point 110, and special subframes may include a downlink portion and an uplink portion separated by a guard period. Different arrangements of downlink, uplink, and special subframes may be referred to as different TDD configurations. Some TDD configurations may have more downlink subframes and some may have more uplink subframes to accommodate different traffic scenarios.

In some designs, the frame structure may be "fixed" (as in FIG. 2A) in that the location of each subframe may be predetermined in relation to an absolute time, but may or may not be occupied by primary RAT signaling in any given instance due to the contention procedure for accessing the communication medium 140. For example, if the access point 110 or the access terminal 120 fails to win contention for a given subframe that subframe may be silenced. In other designs, however, the frame structure may be "floating" (as in FIG. 2B) in that the type of each subframe (downlink, uplink, or special subframe) may be dynamically determined in relation to the point at which access to the communication medium 140 is secured (e.g., CCA clear). For example, the effective start of a given frame (e.g., $RF_{N+1}$) may be delayed in relation to an absolute time until the access point 110 or the access terminal 120 is able to win contention. In another example, start of transmission is delayed until the communication medium 140 is secured and thereafter the TDD configuration may be dynamically configured by the access point 110 (e.g., the next 10 subframes may be designated as DDDDDUUUUU, DDUUUUUUUU, or a different combination of D (i.e., downlink), U (i.e., uplink), and S (i.e., special subframe)).

As will be described in more detail below, one or more subframes designated to carry uplink information (e.g., any or all of the uplink or special subframes in the example of FIGS. 2A-2B) may be configured to provide a physical layer waveform for random access signaling in the form of a Physical Random Access Channel (PRACH). Various associated random access procedures are provided as well to harmonize with the PRACH. Due to the shared nature of the communication medium 140, the PRACH subframe structure and associated random access procedures may be adapted in different ways to better facilitate random access for the access terminal 120 in accordance with any applicable contention rules.

Figure 3:
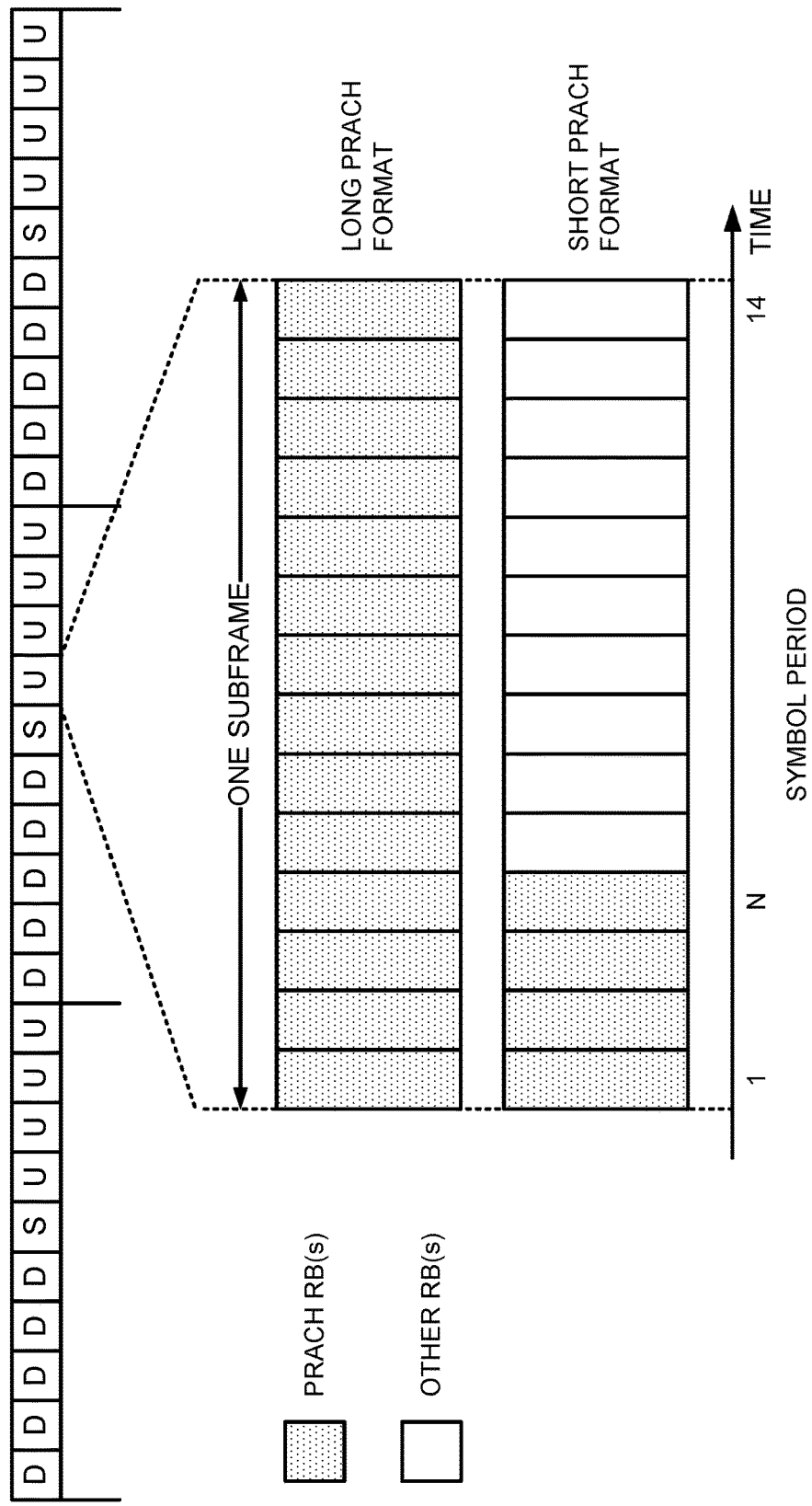
FIG. 3 is a resource map illustrating, in relevant part, example subframe structures for a Physical Random Access Channel (PRACH).

FIG. 3 is a resource map illustrating, in relevant part, example subframe structures for the PRACH. As shown, in different designs, the PRACH may be configured using a relatively long PRACH format occupying all or substantially all of the symbol periods making up the subframe (e.g., 14 symbol periods for a normal cyclic prefix) or a relatively short PRACH format occupying a subset N of less than all of the symbol periods making up the subframe. It will be appreciated that the short PRACH is shown in FIG. 3 as occupying the first N symbols of the subframe for illustration purposes only, and that in other designs the short PRACH may occupy the last N symbols of the subframe, an intervening N symbols of the subframe, and so on.

In general, a long PRACH format may allow for more signaling to be accommodated within a given subframe, while a short PRACH format may allow for more efficient resource utilization over the communication medium 140—due, for example, to special exemptions for short transmission durations. As discussed above, however, the contention rules for the communication medium 140 may vary across frequency bands, geography, and so on. In some deployments, the access terminal 120 may transmit on the PRACH automatically, without contending for access to the communication medium 140. For example, the current ETSI contention rules in Europe allow for a certain fraction of transmissions (e.g., 5%) to proceed without the need for contention even though contention is otherwise generally required. In other deployments, however, the access terminal 120 may be required to contend for access to the communication medium 140 to transmit on the PRACH. Accordingly, in some designs, the access point 110 may advertise various contention-related parameters for the access terminal 120 to utilize in performing random access.

Figure 4:
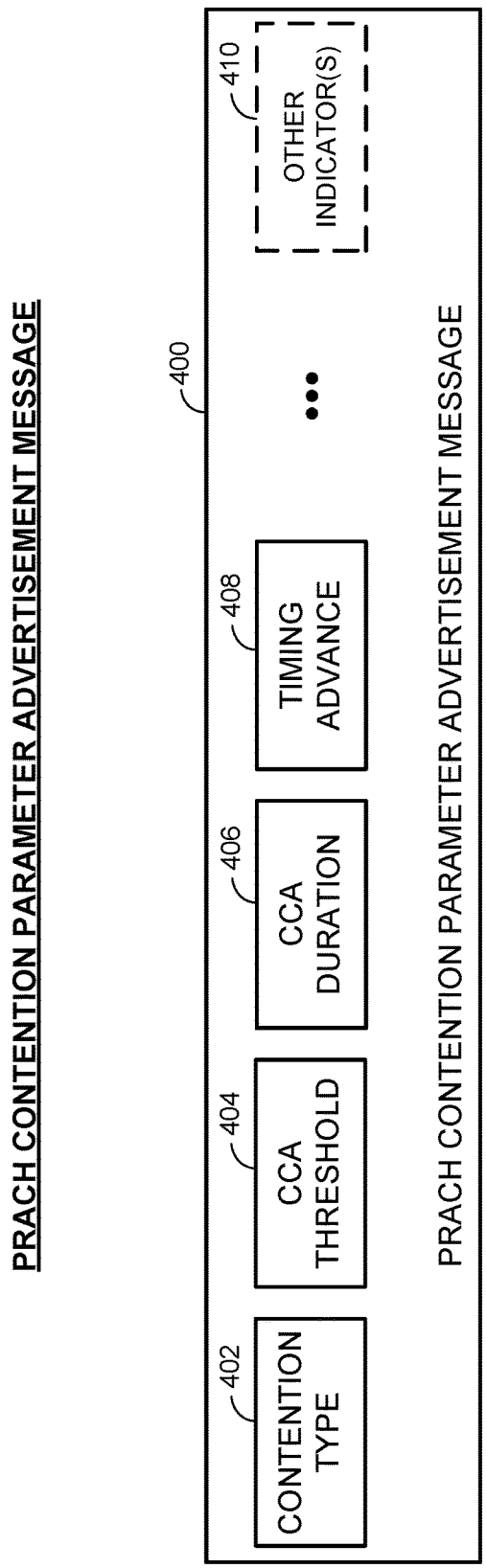
FIG. 4 illustrates an example PRACH contention parameter advertisement message.

FIG. 4 illustrates an example broadcast message referred to for illustration purposes as a PRACH contention parameter advertisement message. In this example, the PRACH contention parameter advertisement message 400 includes, in relevant part, a contention type indicator 402, a CCA threshold indicator 404, a CCA duration indicator 406, a timing advance indicator 408, and any other indicators 410 as appropriate for a given implementation. It will be appreciated that the single PRACH contention parameter advertisement message 400 is shown for illustration purposes only, and that in different designs and scenarios the various indicators may be transmitted in different sets of messages, as separate individual messages, and so on, or may be omitted entirely, as appropriate.

The contention type indicator 402 may be used to indicate whether and to what extent contention is in effect for transmission on the PRACH (e.g., via a predetermined category or the like defining different types of contention). For example, the contention type indicator 402 may indicate that no contention is in effect (e.g., so-called "Category 1" LBT), that contention without random back-off is in effect (e.g., so-called "Category 2" LBT), that contention with random back-off having a fixed-size contention window is in effect (e.g., so-called "Category 3" LBT), that contention with random back-off having a variable-size contention window is in effect (e.g., so-called "Category 4" LBT), and so on. Accordingly, based on the contention type indicator 402, the access terminal 120 may selectively contend for access to the communication medium 140 for PRACH signaling, rather than being preprogrammed to perform or not perform contention.

The CCA threshold indicator 404 may be used to indicate an energy threshold used for CCA that is specific to the PRACH, which may be different from the threshold used for other channels (e.g., a Physical Uplink Shared Channel (PUSCH)). As an example, the energy threshold for the PRACH may be higher (i.e., the communication medium 140 is sensed busy at higher energy thresholds) as compared to the PUSCH to promote more aggressive contention since the PRACH typically occurs less frequently and the impact of missed transmission opportunities is therefore more pronounced. The CCA duration indicator 406 may be used to indicate the duration of an associated contention window for the contention process.

The timing advance indicator 408 may be used to indicate whether (and, in some instances, to what extent) an uplink transmission offset is in effect for transmission on the PRACH. This offset may be used for receiver alignment purposes. Accordingly, based on the timing advance indicator 408, the access terminal 120 may transmit and the access point 110 may receive PRACH signaling at a modified start time with respect to a subframe boundary (e.g., at an earlier time than that ordinarily defined for the PRACH by the TDD frame structure).

The PRACH contention parameter advertisement message 400 may be transmitted (e.g., broadcast) by the access point 110 and received by the access terminal 120 semi-statically, such as via Master Information Block (MIB) signaling, System Information Block (SIB) signaling, and so on.

Returning to FIG. 3, each PRACH symbol period may span one or more Resource Blocks (RBs) formed from a set of subcarriers in the frequency domain. For frequency diversity, power usage efficiency, and to meet various channel occupancy requirements, the RBs dedicated to PRACH may be interlaced across a corresponding channel bandwidth.

Figure 5:
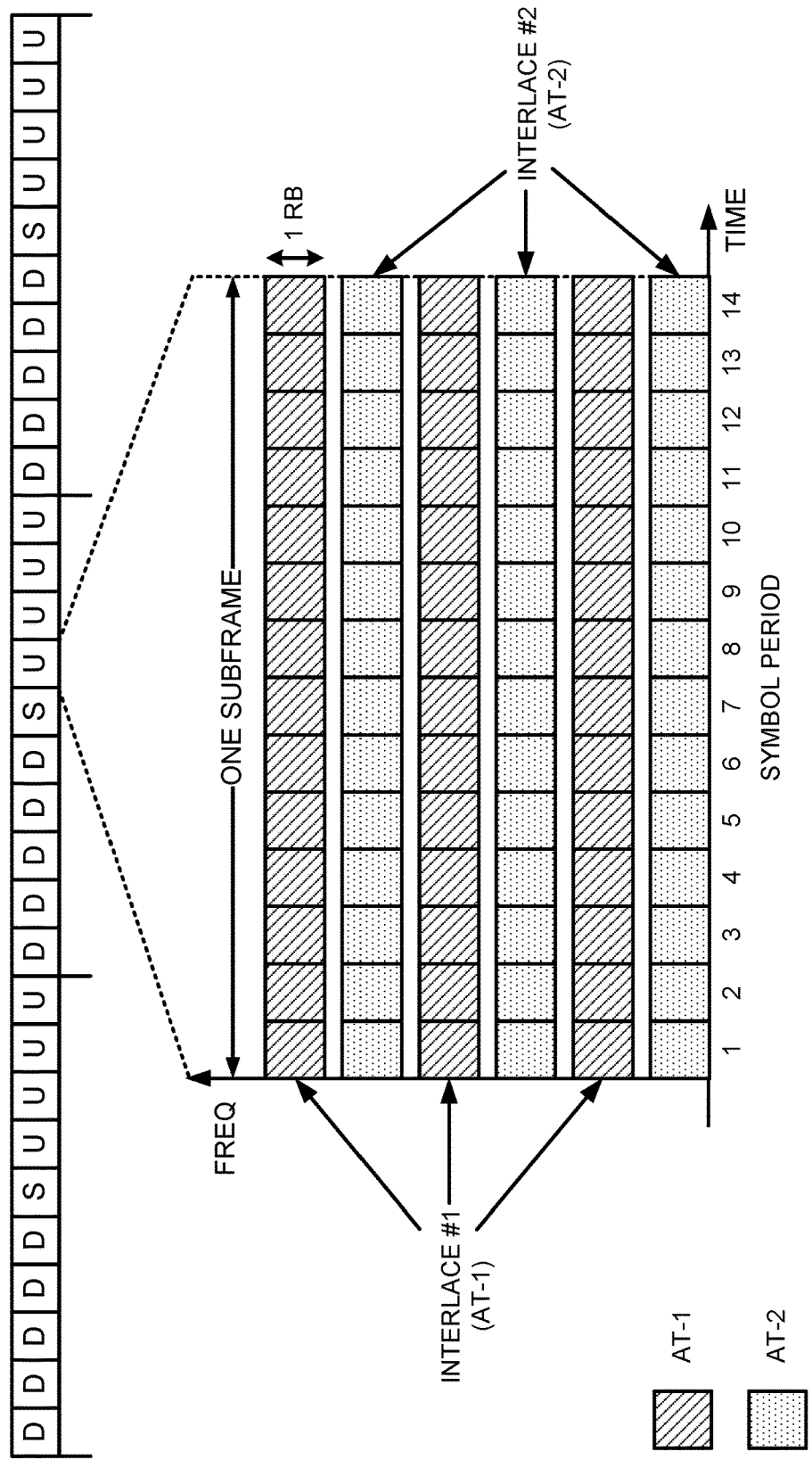
FIG. 5 is a resource map illustrating an example PRACH multiplexing scheme across access terminals.

FIG. 5 is a resource map illustrating an example PRACH multiplexing scheme across access terminals. As shown, the PRACH may be frequency division multiplexed by allocating different interlaces to different access terminals.

In the illustrated example, a first interlace (interlace #1) may be allocated to a first access terminal AT-1 (e.g., the access terminal 120) and a second interlace (interlace #2) may be allocated to a second access terminal AT-2. As an example, for a 20 MHz channel bandwidth with 100 RBs, a set of 10 RBs consisting of every 10th RB may be dedicated to PRACH for the access terminal 120. Other channels such as a Physical Uplink Shared Channel (PUSCH), a Physical Uplink Control Channel (PUCCH), etc., may occupy other intervening interlaces (not shown).

It will be appreciated that the one-to-one correspondence of interlaces to access terminals is shown for illustration purposes only, and that in different designs and scenarios, more than one access terminal may be assigned to a given interlace (e.g., via code division multiplexing), a given access terminal may occupy more than one interlace, and so on. Further, it will be appreciated that each interlace may be fully or only partially occupied by the PRACH depending on the format (e.g., short or long) being employed for the PRACH.

Returning again to FIG. 3, it will be appreciated that the configuration of one uplink subframe for the PRACH is shown for illustration purposes only, and that a similar configuration may be applied to multiple uplink subframes, to other subframes having a segment dedicated to uplink signaling (e.g., a special subframe), and so on. In particular, due to its occupying less than a full subframe, the short PRACH format may be provided via truncated subframes such as special subframes. Still further, the access point 110 may simply provide a PRACH configuration of one or more subframes to transmit PRACH and these subframes may not have any predefined type (e.g., DL or UL). The access point 110 may configure such subframes dynamically to be downlink or uplink and the access terminal 120 doing PRACH may not have a priori knowledge of this when transmitting PRACH.

Figure 6A:
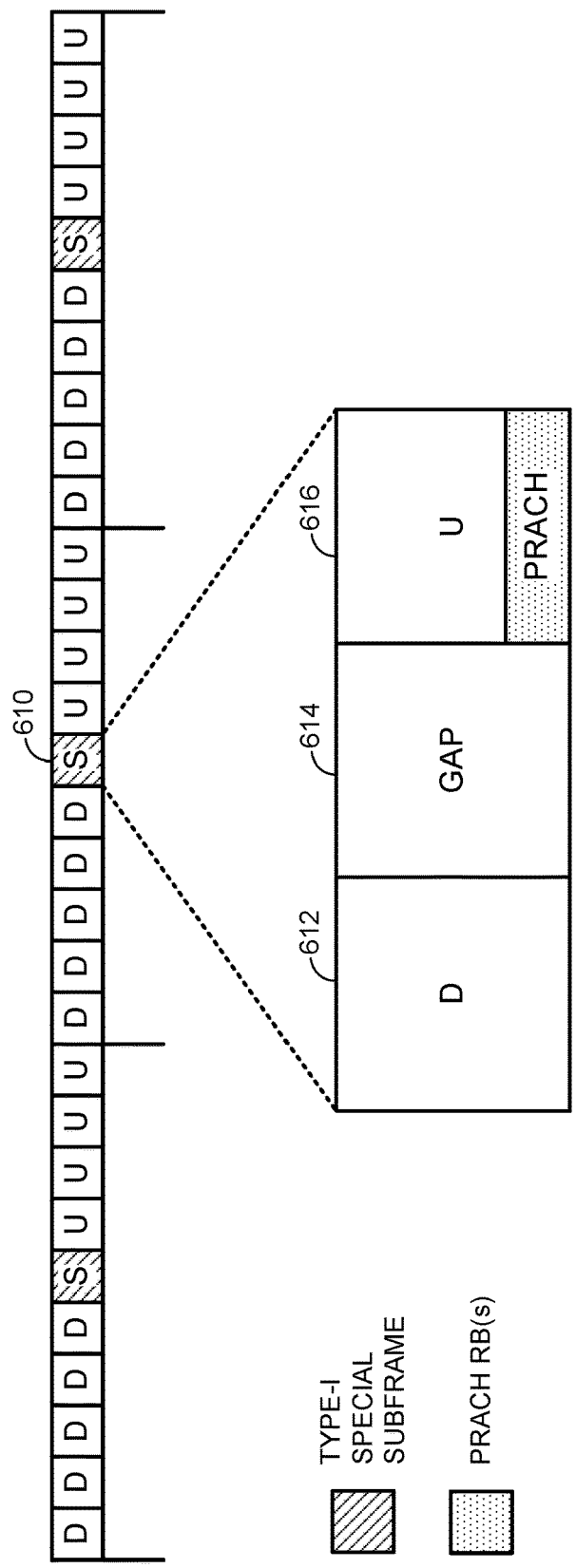
FIGS. 6A-6B illustrate example special subframe structures that may be utilized for a short PRACH format.
Figure 6B:
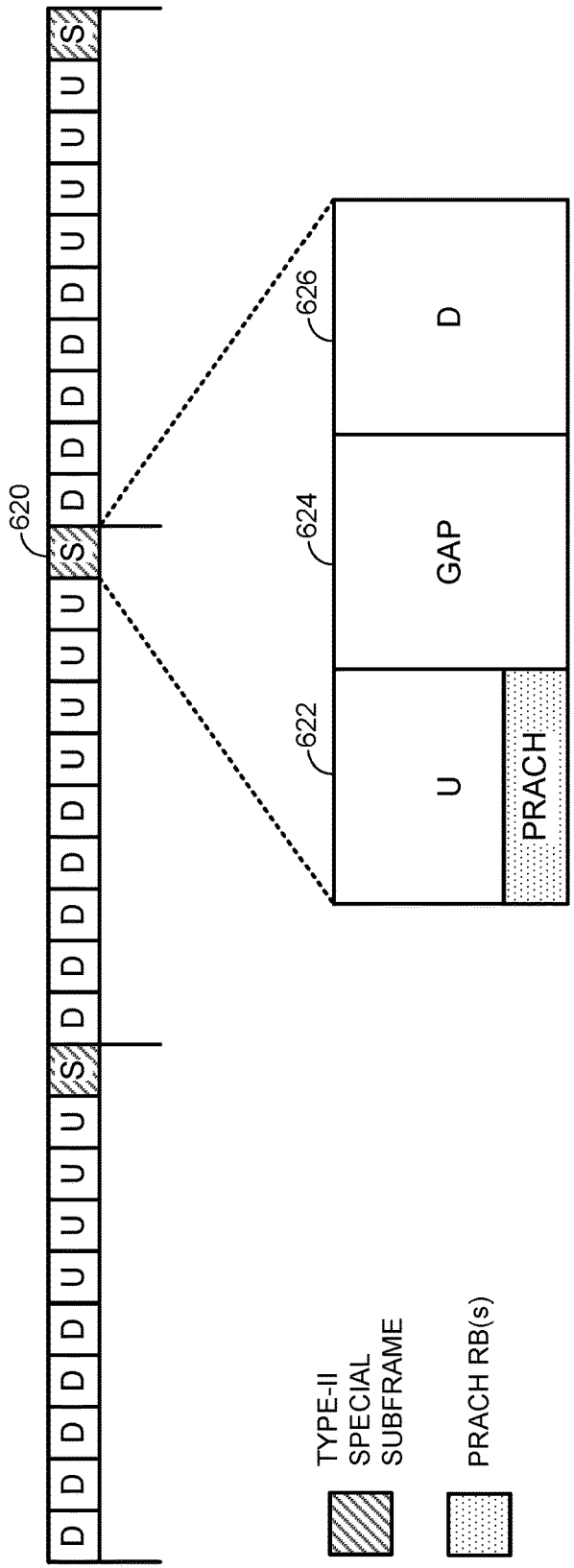

FIGS. 6A-6B illustrate example special subframe structures that may be utilized for the short PRACH format. In the design of FIG. 6A, the special subframe 610 is referred to as a "type-I" special subframe and divided into three portions, including a downlink portion 612, followed by a gap portion 614, followed by an uplink portion 616. As shown, in this design, the PRACH may be situated in the uplink portion 616 at the end of the type-I special subframe 610. In the design of FIG. 6B, the special subframe 620 is referred to as a "type-II" special subframe and again divided into three portions but with a different temporal arrangement, including an uplink portion 622, followed by a gap portion 624, followed by a downlink portion 626. As shown, in this design, the PRACH may be situated in the uplink portion 622 at the beginning of the type-II special subframe 620. The length of each portion may be variable, including of zero length, in different scenarios.

As is further illustrated in FIGS. 6A-6B, the location of the type-I special subframe 610 and the type-II special subframe 620 may be offset from one another within the frame structure to accommodate the different temporal arrangements of the uplink/downlink portions. In particular, the type-I special subframe 610 may be deployed at the downlink-to-uplink transition boundary (e.g., between a burst of downlink subframes followed by a burst of uplink subframes) to align the downlink portion 612 with a preceding downlink subframe and to align the uplink portion 616 with a succeeding uplink subframe (e.g., to minimize the overhead associated with transition). In contrast, the type-II special subframe 620 may be deployed at the uplink-to-downlink transition boundary (e.g., between a burst of uplink subframes followed by a burst of downlink subframes) to align the uplink portion 622 with a preceding uplink subframe and to align the downlink portion 626 with a succeeding downlink subframe (e.g., again, to minimize the overhead associated with transition).

In either case, the gap portion 614 of the type-I special subframe 610 or the gap portion 624 of the type-II special subframe 620 may be used for contention (e.g., CCA) for gaining access to the communication medium 140, for timing advance to handle propagation delays in TDD systems, or, in some deployments, may be skipped such as when the PRACH carries contention-exempt signaling. The type-II special subframe 620 may be advantageous in such deployments because the gap portion 624 may instead be used for contention for the upcoming downlink subframes.

Figure 7:
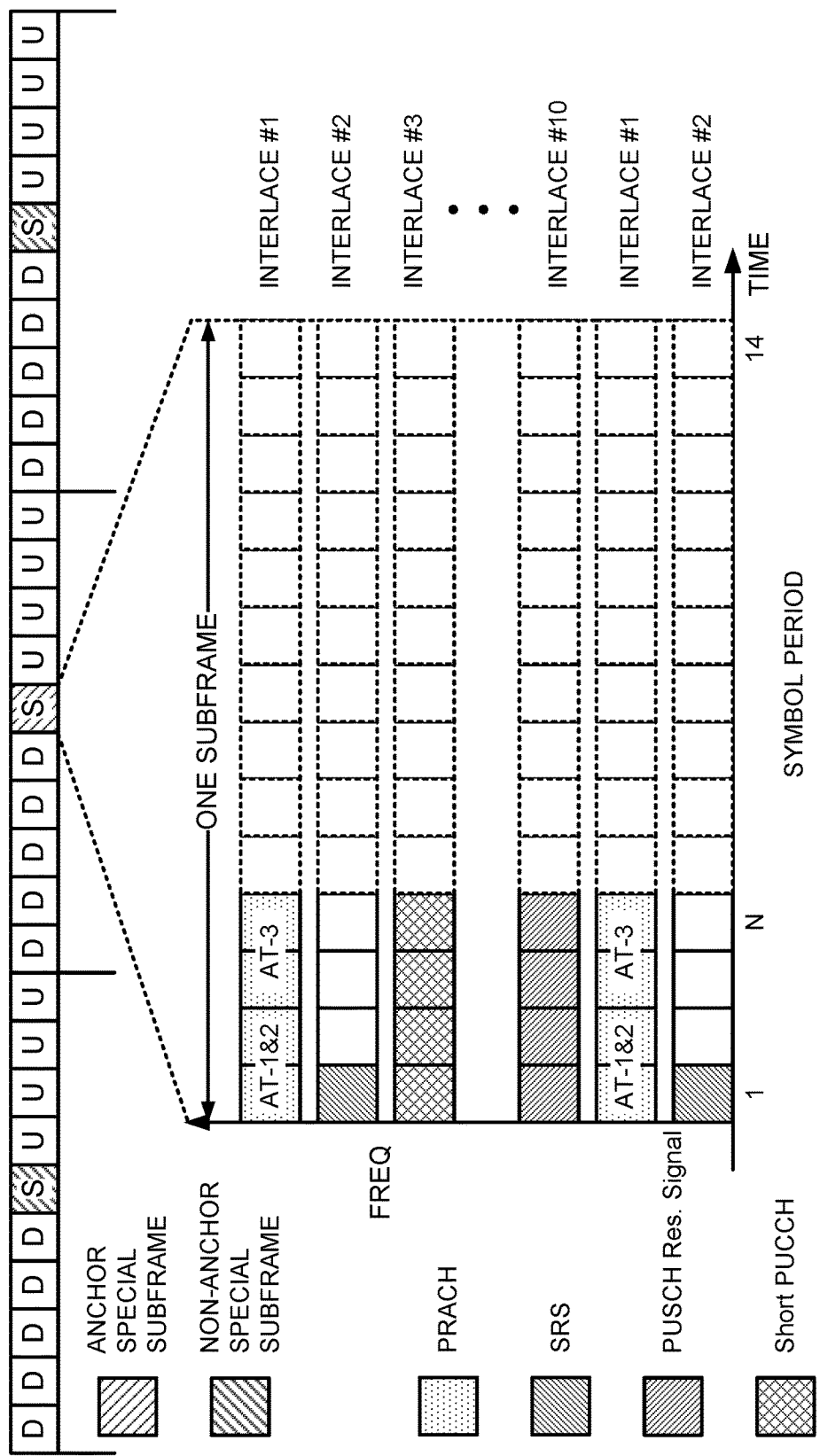
FIG. 7 is a resource map illustrating an example PRACH multiplexing scheme for a short PRACH format.

FIG. 7 is a resource map illustrating an example PRACH multiplexing scheme for a short PRACH format. As shown, the PRACH may be frequency division multiplexed with other channels in different RB interlaces. In this example, the PRACH is configured on a first interlace (interlace #1) and other interlaces are used for Sounding Reference Signaling (SRS), certain PUSCH signaling, a short PUCCH, and so on. Within the first interlace (interlace #1) used for the PRACH, different access terminals may be multiplexed, shown by way of example as a first access terminal AT-1 and a second access terminal AT-2 utilizing the first two symbol periods (e.g., via code division multiplexing) and a third access terminal AT-3 utilizing the next two symbol periods.

As is further shown in FIG. 7, the PRACH may be transmitted periodically on an anchor subframe that is largely guaranteed to be available (e.g., via aggressive contention) or opportunistically in non-anchor subframes. Anchor subframes may be scheduled with different periodicities in different designs (e.g., every 10 ms, every 20 ms, etc.). Non-anchor subframes may be transmitted in between the periodic anchor subframes. The access point 110 may configure whether to use the non-anchor subframes for opportunistic PRACH or not. The anchor subframe type (e.g., special subframe or uplink subframe) may be predetermined or dynamically configured by the access point 110. The access terminal 120 is configured with the time location of anchor subframes and symbols within the subframe to use for the short PRACH. In addition or as an alternative, the access point 110 may only configure non-anchor subframes for the access terminal 120 to send PRACH. The access point 110 may dynamically reconfigure such subframes without requiring the access terminal 120 to be aware of the configuration in order to transmit PRACH.

In the illustrated example, the short PRACH is carried on a special subframe. In some implementations, however, the short PRACH can be carried in a regular uplink subframe with some modifications. For example, the last few symbols of a regular uplink subframe can be designated for the PRACH and the remaining symbols may be used for carrying regular uplink data (e.g., PUSCH).

In some implementations, the access terminal 120 may be configured with location (time and frequency resources) allowed for the PRACH, but the actual subframe type may not be known beforehand, i.e., the anchor subframes need not be predefined to be special subframes or regular uplink subframes. The access terminal 120 can configure this particular subframe to be one of either type dynamically.

Figure 8:
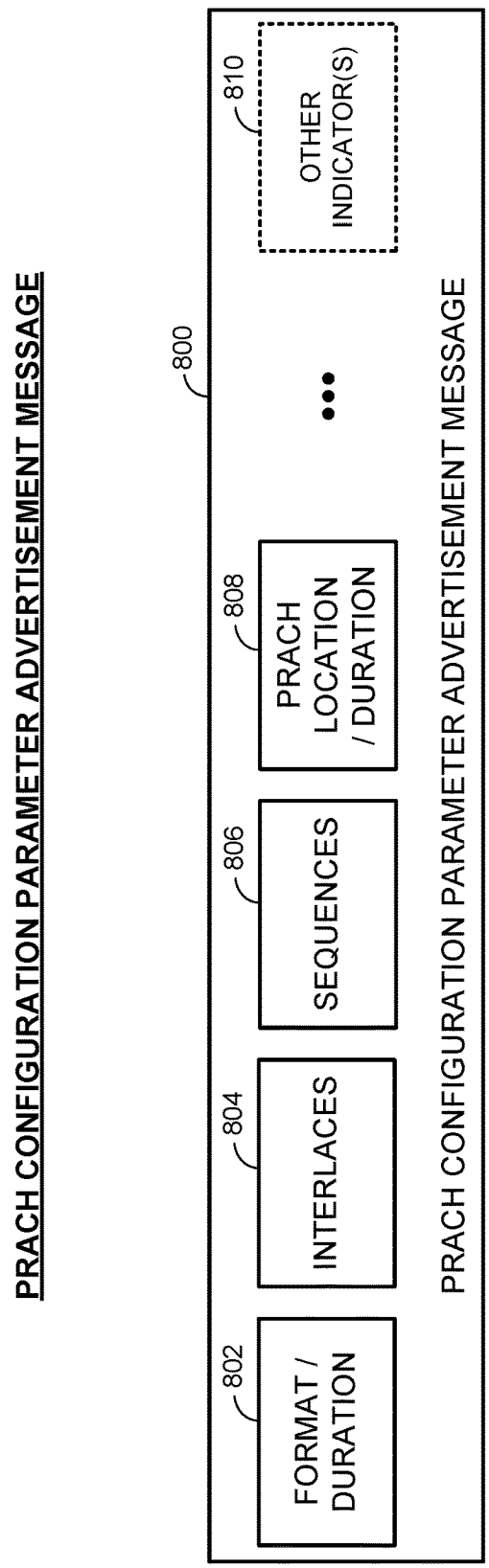
FIG. 8 illustrates an example PRACH configuration parameter advertisement message.

FIG. 8 illustrates another example broadcast message referred to for illustration purposes as a PRACH configuration parameter advertisement message. In this example, the PRACH configuration parameter advertisement message 800 includes, in relevant part, a format/duration indicator 802, an interlaces indicator 804, a sequences indicator 806, a PRACH location/duration indicator 808, and any other indicators 810 as appropriate for a given implementation. It will be appreciated that the single PRACH configuration parameter advertisement message 800 is shown for illustration purposes only, and that in different designs and scenarios the various indicators may be transmitted in different sets of messages, as separate individual messages, and so on, or may be omitted entirely, as appropriate. As an example, it will also be appreciated that the PRACH configuration parameter advertisement message 800 may be combined, in whole or in part, with the PRACH contention parameter advertisement message 400.

The format/duration indicator 802 may be used to indicate the format (e.g., short or long) being employed for the PRACH as well any relevant duration information (e.g., the number of symbol periods occupied by a given short PRACH format). The interlaces indicator 804 may be used to indicate the allowed RB interlaces reserved for the PRACH. The sequences indicator 806 may be used to indicate the allowed preamble sequences reserved for the random access procedure. The PRACH location/duration indicator 808 may be used to indicate the location and duration of PRACH resources, such as via the starting position and length of a downlink portion of the subframe in which the PRACH is deployed, if applicable (e.g., the downlink portion 626 at the end of the type-II special subframe 620).

The PRACH configuration parameter advertisement message 800 may be transmitted (e.g., broadcast) by the access point 110 and received by the access terminal 120 semi-statically, such as via MIB signaling, SIB signaling, and so on.

Figure 9:
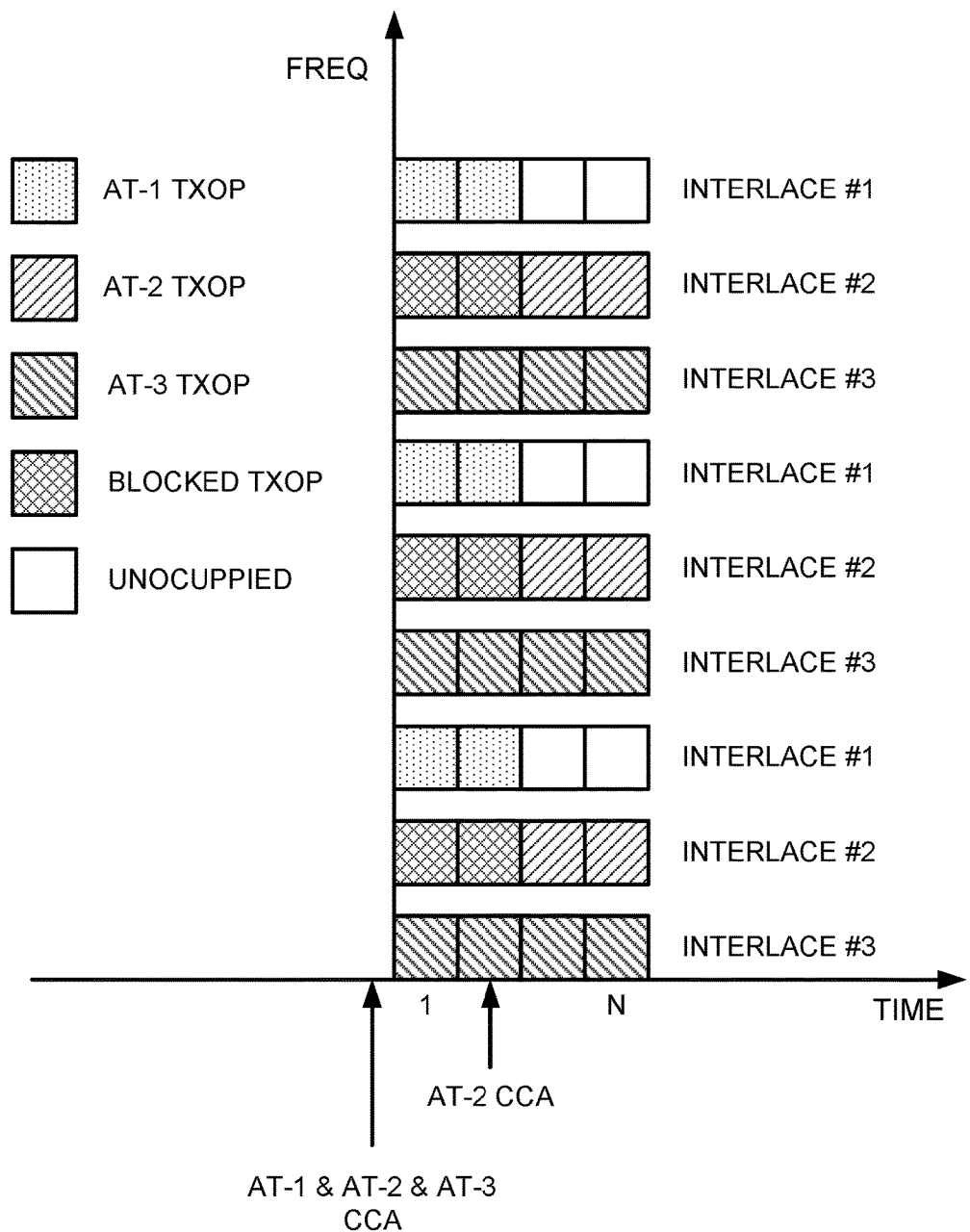
FIG. 9 is a resource map illustrating an example partial utilization scheme within a short PRACH format channel structure.

FIG. 9 is a resource map illustrating an example partial utilization scheme within a short PRACH format channel structure. As shown, in some designs and scenarios, the PRACH may be configured to reserve a greater number of resources than are utilized by access terminal PRACH Transmission Opportunities (TXOPs). This may provide, for example, a higher PRACH capacity and facilitate opportunistic PRACH within a subframe to mitigate blocked TXOPs due to the shared nature of the communication medium 140.

In the illustrated example, as in the example of FIG. 5, a first access terminal AT-1 (e.g., the access terminal 120) may use a first interlace (interlace #1) and a second access terminal AT-2 may use a second interlace (interlace #2). As an example, the access terminals may choose one or more interlaces to use out of all of the interlaces configured for the PRACH in a random or pseudorandom manner. However, the first access terminal AT-1 and the second access terminal AT-2 may only use blocks of two symbol periods for their PRACH transmissions.

As shown, the first access terminal AT-1 and the second access terminal AT-2 may each contend for access to the communication medium 140 (e.g., perform CCA) at some time prior to the start of the PRACH. In the illustrated example, the first access terminal AT-1 is successful and transmits in its respective interlace #1 on the first two symbol periods of the PRACH. The second access terminal AT-2, however, is unsuccessful and blocked from transmitting in its respective interlace #2 on the first two symbol periods of the PRACH. The second access terminal AT-2 therefore again contends for access to the communication medium 140 at some later time within the PRACH. Ultimately, the second access terminal AT-2 is successful and transmits in its respective interlace #2 on the next two symbol periods of the PRACH.

By reserving additional resources for the PRACH, an access terminal that is not able to secure access to the communication medium 140 at the start of the PRACH may be able to later opportunistically seize the communication medium 140 and complete transmission within the PRACH. Typically an access terminal ramps up its transmission power across different PRACH attempts. However, for opportunistic transmission within a subframe, transmission power ramp-up is not used.

In some implementations, when additional resources are reserved for the PRACH and the PRACH is transmitted without contention, the access terminals may randomly choose a starting symbol period for sending their PRACH preamble. For example, with 4 symbol periods reserved for the PRACH and a 2 symbol period preamble duration, an access terminal may randomly choose to transmit the PRACH preamble either in symbol 1 or symbol 3.

Returning to FIG. 9, while a partial utilization may be appropriate for some access terminals, other access terminals may utilize additional resources as needed. For example, access terminals performing handover or access terminals near the edge of the coverage region provided by the access point 110 (e.g., having a path loss greater than a threshold) may utilize resources spanning additional symbol periods of the PRACH to facilitate more robust transmission. In the illustrated example, a third interlace (interlace #3) and all of its associated symbol periods may be utilized by a third access terminal AT-3 under such conditions.

Figure 10:
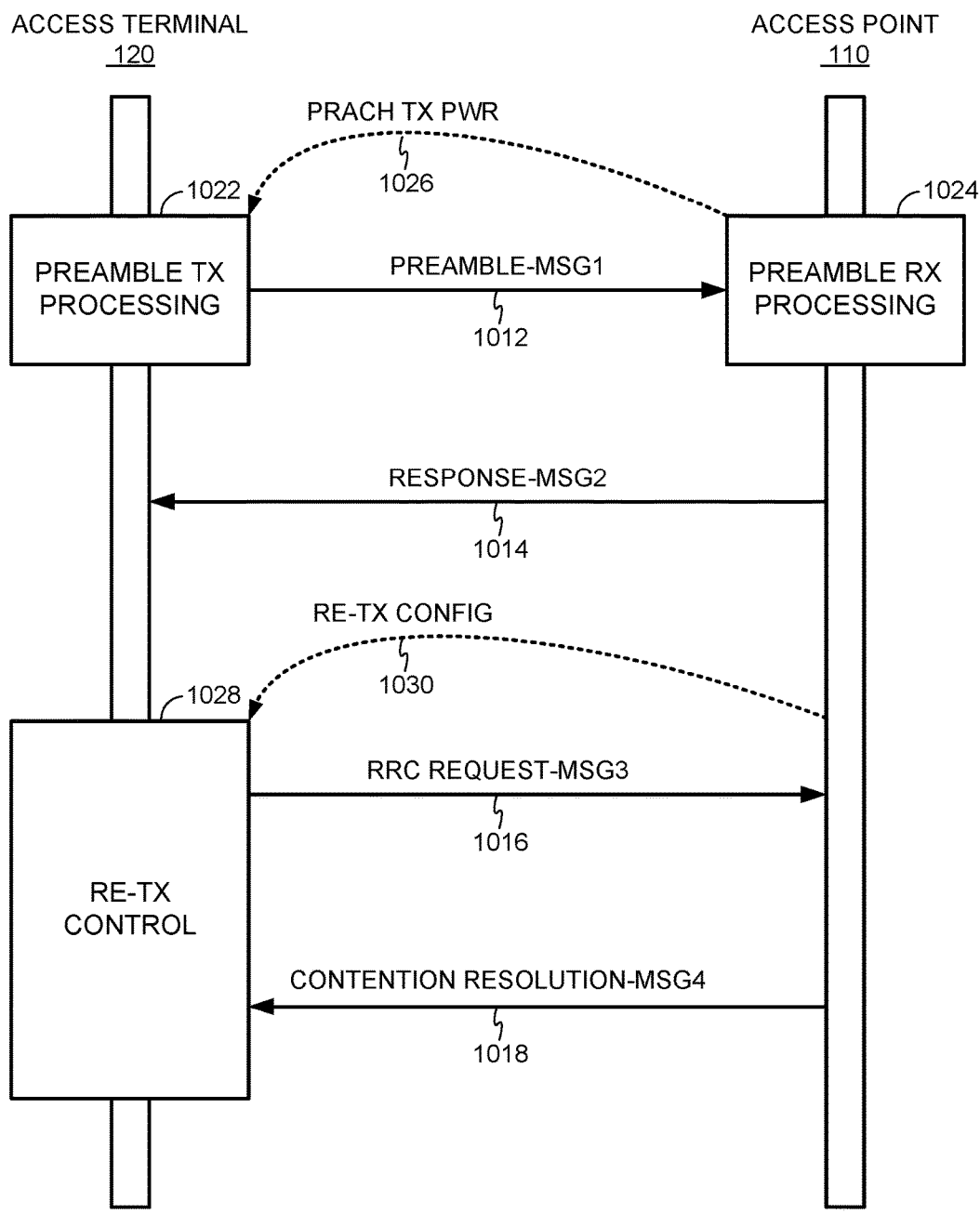
FIG. 10 is a signaling flow diagram illustrating an example adaptation of a random access procedure that may be employed in conjunction with the PRACH.

FIG. 10 is a signaling flow diagram illustrating an example adaptation of a random access procedure that may be employed in conjunction with the PRACH. In this example, the access terminal 120 is performing a contention-based random access procedure over the PRACH to gain access to uplink resources provided by the access point 110.

Contention-based random access may be performed as a generally four-part procedure. Initially, the access terminal 120 may transmit a random access preamble (Msg1 1012), the format and PRACH time domain resource allocation of which may be indicated by a PRACH-ConfigurationIndex parameter or the like. In conjunction with transmitting Msg1, the access terminal 120 may set a Random Access Response (RAR) timer (e.g., in accordance with an ra-ResponseWindowSize parameter) and wait for an RAR message (Msg2 1014) on a common control channel (e.g., a Physical downlink Control Channel (PDCCH)). Upon receiving Msg2 before the RAR timer expires, the access terminal 120 may cancel the RAR timer. Otherwise, the access terminal 120 may retransmit Msg1 1012.

In Msg2, the access terminal 120 may receive the timing alignment value, resources (uplink grant), and a temporary identifier (e.g., Cell Radio Network Temporary Identifier (C-RNTI)) to be utilized in transmitting a Radio Resource Control (RRC) request (Msg3 1016). In conjunction with transmitting Msg3, the access terminal 120 may set a Contention Resolution (CR) timer (e.g., in accordance with a mac-ContentionResolutionTimer parameter).

After transmission of Msg3, the access terminal 120 may monitor the common control channel for a CR message containing its temporary identifier (Msg4 1018) until expiration of the CR timer. In conjunction with successfully decoding Msg4, the access terminal 120 may cancel the CR timer (block 1028).

For harmonization with a short PRACH format as described herein, the access terminal 120 may select the random access preamble (Msg1 1012) from an allocated set of Demodulation Reference Signal (DMRS) sequences in different ways (preamble transmission (TX) processing block 1022). The DMRS sequence used by the access terminal 120 in different symbol periods within a given subframe may be identical or may be different. When they are different, the second DMRS sequence may be completely different (e.g., from a different root sequence) or may use a different cyclic shift from the original sequence. Further, for multiple PRACH attempts for Msg1 1012 transmission (e.g., when the access terminal 120 is unable to secure access to the communication medium 140 or when the access point 110 does not receive the PRACH correctly), the DMRS sequences used by the access terminal 120 may again be the same or different. However, a different DMRS sequence may help to reduce the probability of collision with other access terminals. As an example, the second DMRS sequence may be chosen to be a cyclic shift of the first DMRS sequence, where the cyclic shift to be used is a function of the PRACH attempt number.

For its part, the access point 110 may demodulate the random access preamble (Msg1 1012) in different ways (preamble reception (RX) processing block 1024). In general, the access point 110 may perform per-RB processing for DMRS sequences of the PRACH and non-coherent energy combining across RBs. Within an RB, the access point 110 may perform various operations. As an example, the access point 110 may perform independent processing across different symbol periods and non-coherent combining across symbol periods. As another example, the access point 110 may perform coherent detection of a second symbol period (e.g., using a first symbol period to obtain a channel estimate and using this channel estimate for coherent demodulation of the second symbol period DMRS sequence) and determine the peak correlation value. As another example, the access point 110 may perform coherent processing within one symbol period (e.g., cross-correlating the first symbol period with a known preamble segment, cross-correlating the second symbol period with the known preamble and channel estimate, and combining coherently/non-coherently across two symbols and obtaining the peak correlation value).

In certain systems, a narrowband PRACH waveform may be used for transmission of the random access preamble (Msg1 1012) (e.g., using only one or a closely spaced subset of RB interlaces). However, regulations on the communication medium 140 may restrict the power for narrowband transmission—i.e., narrowband transmissions may need to obey certain power spectral density limits. To facilitate use of a narrowband PRACH waveform, the access point 110 may in some instances additionally advertise an (optional) PRACH transmission power parameter message 1026 separately indicating the maximum transmission power permitted for transmission of the random access preamble (Msg1 1012) as compared to other uplink transmissions (e.g., via the PUSCH). The PRACH transmission power parameter message 1026 may be transmitted (e.g., broadcast) by the access point 110 and received by the access terminal 120 semi-statically, such as via MIB signaling, SIB signaling, and so on. By separating the PRACH transmission power parameter message 1026 from other transmission power limit messages, the random access preamble (Msg1 1012) may be made to conform to applicable power spectral density limits without impacting the transmission power of other messages such as the RRC request (Msg3 1016).

Conventionally, the Random Access Network Temporary Identifier (RA-RNTI) used to identify the access terminal 120 during the random access procedure may be derived from the random access preamble (Msg1 1012) transmission timing and location in the frequency domain. In legacy LTE, for example, the RA-RNTI is a 16-bit value that is computed according to the following equation:

$$\text{RA-RNTI} = 1 + t\_id + 10 * f\_id \qquad (\text{Eq. 1})$$

Here, t_id is the index of the first subframe of the specified PRACH ($0 \leq t\_id < 10$) and f_id is the index of the specified PRACH within that subframe, in ascending order of frequency domain ($0 \leq f\_id < 6$).

To enhance the definition of the RA-RNTI to better suit the wideband (RB interlaced) waveform of the PRACH described herein and the option of transmission in a special subframe (where typically only one special subframe is utilized in a given radio frame, such that the subframe index may not be meaningfully distinguishing), the RA-RNTI may instead be defined as function of the subframe index, the RB interlace, the starting symbol period index of the PRACH (e.g., symbol 1 or symbol 3 in a 4 symbol PRACH region) and/or the DMRS sequence (or associated cyclic shift or some other associated identifier) used. As an example, the modified RA-RNTI may computed according to the following equation:

$$\text{RA-RNTI} = 1 + k * \text{Interlace}\_id + m * \text{DMRS}\_seq\_ID \qquad (\text{Eq. 2})$$

Here, the Interlace_id corresponds to the RB interlace used by the access terminal 120, the DMRS_seq_ID corresponds to the DMRS sequence used by the access terminal 120, and k and m are constants that may be used to separate the variables and expand or shrink the RA-RNTI space as needed.

With reference again to FIG. 10, the RRC request (Msg3 1016) is conventionally retransmitted in accordance with a Hybrid Automatic Repeat Request (HARQ) retransmission scheme. However, the HARQ procedure typically relies on a separate Physical Hybrid-ARQ Indicator Channel (PH- ICH) for conveying acknowledgment messages that may not be available within the frame structure employed by the primary RAT system 100 due to the shared nature of the communication medium 140. Instead, the access terminal 120 may be configured to control retransmission of the RRC request (Msg3 1016) in different ways (re-transmission (RE-TX) control block 1028). As an example, the access terminal 120 may be configured for only single transmission of the RRC request (Msg3 1016), a failure of which will prompt a retry of the random access procedure. As another example, the access terminal 120 may be configured for autonomous retransmission (e.g., if the CR message (Msg4 1018) is not received within a certain time window). To avoid collision, the access point 110 may refrain for a period of time from reallocating the uplink resources assigned for the RRC request (Msg3 1016) to any other access terminals or for any other purposes (e.g., until expiration of the same time window). As shown, the access point 110 may enable autonomous retransmission and any associated parameters via a configuration message or the like (retransmission (RE-TX) configuration message 1030). The retransmission configuration message 1030 may be transmitted (e.g., broadcast) by the access point 110 and received by the access terminal 120 semi-statically, such as via MIB signaling, SIB signaling, and so on. As another example, Msg3 HARQ may be controlled by the access point 110 by retransmission of Msg2. For instance, when the access point 110 does not receive Msg3 in the designated uplink subframe or within a certain time window from the time the grant was conveyed, it retransmits Msg2. After transmitting Msg3, the access terminal 120 continues to search for PDCCH with the expected RA-RNTI in order to decode any retransmitted Msg2. Upon reception of Msg2, the access terminal 120 may retransmit Msg3 and restart the contention resolution timer.

In some implementations, in order to increase reliability of Msg3 reception, the access point 110 may provide multiple uplink grants (i.e., sends Msg2 in multiple subframes). The access terminal 120 may transmit different Msg3 instances in these uplink subframes using different redundancy versions, where the redundancy version to be used in different subframes is conveyed in the corresponding Msg2 payload (e.g., by defining new fields in Msg2 or redefining existing fields for this purpose).

Figure 11:
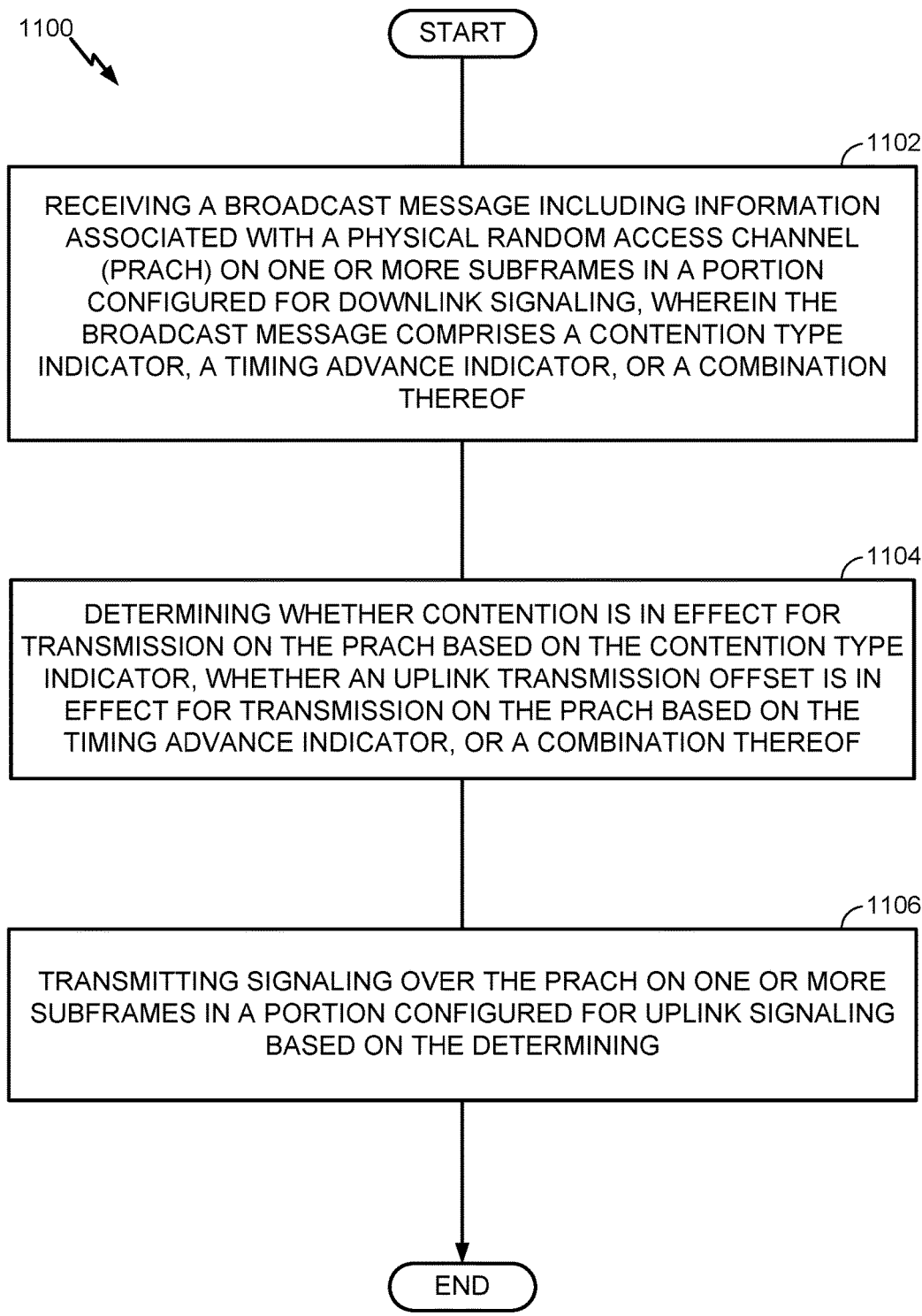
FIG. 11 is a flow diagram illustrating an example method of communication in accordance with the techniques described herein.

FIG. 11 is a flow diagram illustrating an example method of communication in accordance with the techniques described above. The method 1100 may be performed, for example, by an access terminal (e.g., the access terminal 120 illustrated in FIG. 1) operating on a shared communication medium. As an example, the communication medium may include one or more time, frequency, or space resources on an unlicensed radio frequency band shared between LTE technology and Wi-Fi technology devices.

As shown, the access terminal may receive a broadcast message including information associated with a PRACH on one or more subframes in a portion configured for downlink signaling (block 1102). The broadcast message may comprise a contention type indicator, a timing advance indicator, or a combination thereof. The access terminal may then determine whether contention is in effect for transmission on the PRACH based on the contention type indicator, whether an uplink transmission offset is in effect for transmission on the PRACH based on the timing advance indicator, or a combination thereof (block 1104). Based on the determining, the access terminal may transmit signaling over the PRACH on one or more subframes in a portion configured for uplink signaling (block 1106).

As discussed in more detail above, the transmitting may comprise, for example, selectively contending for access to a communication medium for the signaling based on the determining with respect to the contention type indicator. In addition or as an alternative, the transmitting may comprise, for example, transmitting the signaling at a modified start time with respect to a subframe boundary based on the determining with respect to the timing advance indicator.

In some designs or scenarios, the PRACH may correspond to (i) a long PRACH format that occupies substantially all of the symbol periods associated with a given subframe or (ii) a short PRACH format that occupies a subset of less than all of the symbol periods associated with a given subframe. The broadcast message may also further comprise a CCA threshold indicator, a CCA duration indicator, or a combination thereof.

As an example, the uplink portion in which the signaling is transmitted may be located at the end of a subframe configured for PRACH transmission, with the access terminal not determining whether the subframe configured for PRACH transmission corresponds to an uplink subframe type, a downlink subframe type, or a special subframe type. As another example, the uplink portion in which the signaling is transmitted may also be located at the beginning of a subframe configured for PRACH transmission, with the access terminal again not determining whether the subframe configured for PRACH transmission corresponds to an uplink subframe type, a downlink subframe type, or a special subframe type. It will be appreciated that because the access point may configure periodic PRACH opportunities and inform the access terminal of these opportunities, it may not be necessary for the access terminal to determine the type of an associated subframe in order to perform the PRACH transmission, which may be particularly helpful for floating TDD frame structures as described above where subframe type may be dynamically configured. The PRACH may comprise, for example, one or more RBs across one or more symbol periods that are reserved for opportunistic transmission following a blocked transmission opportunity.

In some designs or scenarios, the access terminal may also receive a format/duration indicator, an interlaces indicator, a sequences indicator, a PRACH location/duration indicator, or a combination thereof, in the broadcast message or in a separate broadcast message. The access terminal may also transmit, for a second symbol within the PRACH or for a second PRACH attempt, a random access preamble from an allocated set of DMRS sequences, the random access preamble corresponding to a second DMRS sequence that is (i) identical to a first DMRS sequence, (ii) completely different from the first DMRS sequence, or (iii) a cyclically shifted version of the first DMRS sequence. The access terminal may also receive a PRACH-specific maximum transmission power parameter for a narrowband PRACH waveform that sets a different maximum transmission power than a PUSCH. The access terminal may also transmit an RA-RNTI that is a function of a subframe index, an RB interlace, a DMRS sequence employed for the PRACH, or a combination thereof. The access terminal may also configure itself for single transmission or autonomous retransmission of an RRC request message as part of a random access procedure.

Figure 12:
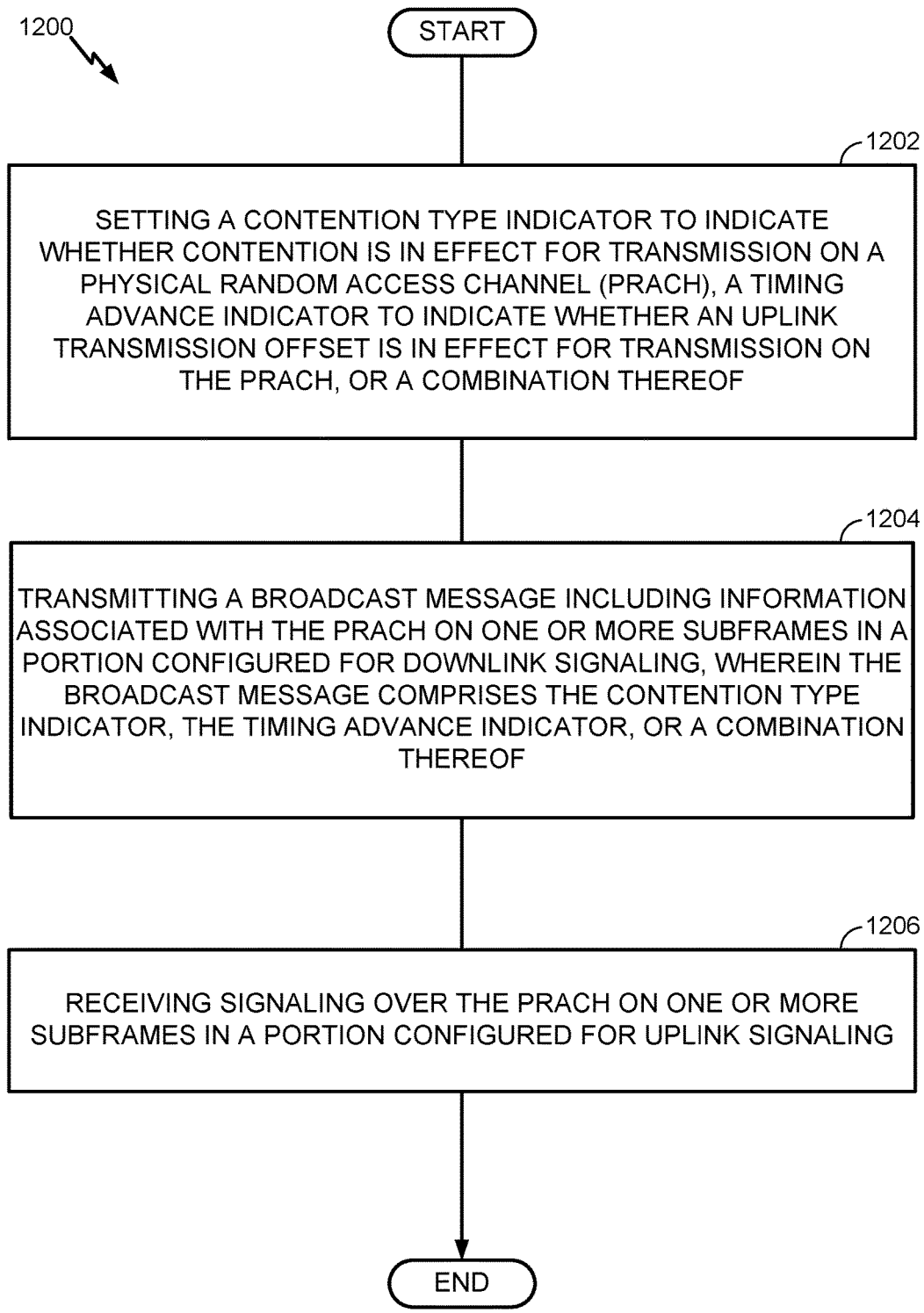
FIG. 12 is a flow diagram illustrating another example method of communication in accordance with the techniques described herein.

FIG. 12 is a flow diagram illustrating another example method of communication in accordance with the techniques described above. The method 1200 may be performed, for example, by an access point (e.g., the access point 110 illustrated in FIG. 1) operating on a shared communication medium. As an example, the communication medium may include one or more time, frequency, or space resources on an unlicensed radio frequency band shared between LTE technology and Wi-Fi technology devices.

As shown, the access point may set a contention type indicator to indicate whether contention is in effect for transmission on a PRACH, a timing advance indicator to indicate whether an uplink transmission offset is in effect for transmission on the PRACH, or a combination thereof (block 1202). The access point may then transmit a broadcast message associated with the PRACH on one or more subframes in a portion configured for downlink signaling (block 1204). The broadcast message may comprise the contention type indicator, the timing advance indicator, or a combination thereof. The access point may receive signaling over the PRACH on one or more subframes in a portion configured for uplink signaling (block 1206).

As discussed in more detail above, the PRACH may correspond to (i) a long PRACH format that occupies substantially all of the symbol periods associated with a given subframe or (ii) a short PRACH format that occupies a subset of less than all of the symbol periods associated with a given subframe. The broadcast message may also further comprise a CCA threshold indicator, a CCA duration indicator, or a combination thereof.

The uplink portion in which the signaling is received may be located at the end of a special subframe following a downlink portion and a gap portion of the special subframe, with the special subframe being located at a downlink-to-uplink transition boundary within a TDD frame structure. The uplink portion in which the signaling is received may also be located at the beginning of a special subframe preceding a downlink portion and a gap portion of the special subframe, with the special subframe being located at an uplink-to-downlink transition boundary within a TDD frame structure. The PRACH may comprise, for example, one or more RBs across one or more symbol periods that are reserved for opportunistic transmission following a blocked transmission opportunity.

In some designs or scenarios, the access point may also transmit a format/duration indicator, an interlaces indicator, a sequences indicator, a PRACH location/duration indicator, or a combination thereof, in the broadcast message or in a separate broadcast message. The access point may also demodulate a random access preamble selected from an allocated set of DMRS sequences by performing per-RB processing and non-coherent energy combining across RBs. The access point may also transmit a PRACH-specific maximum transmission power parameter for a narrowband PRACH waveform that sets a different maximum transmission power than a PUSCH. The access point may also receive an RA-RNTI that is a function of a subframe index, an RB interlace, a DMRS sequence employed for the PRACH, or a combination thereof. The access point may also configure an access terminal for single transmission or autonomous retransmission of an RRC request message as part of a random access procedure.

For generality, the access point 110 and the access terminal 120 are shown in FIG. 1 only in relevant part as including the random access channel manager 112 and the random access channel manager 122, respectively. It will be appreciated, however, that the access point 110 and the access terminal 120 may be configured in various ways to provide or otherwise support the random access signaling techniques discussed herein.

Figure 13:
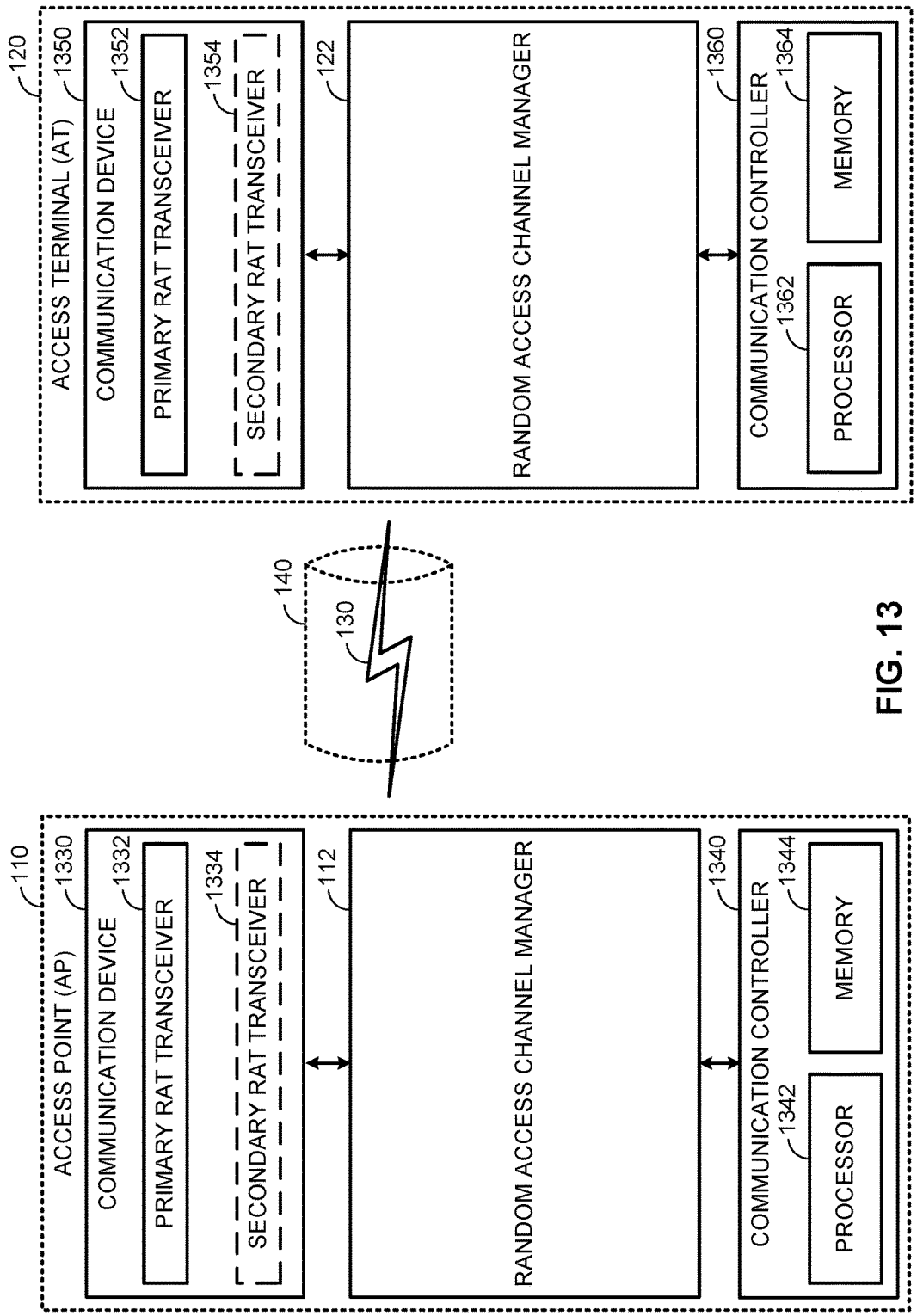
FIG. 13 is a device-level diagram illustrating example components of an access point and an access terminal in more detail.

FIG. 13 is a device-level diagram illustrating example components of the access point 110 and the access terminal 120 of the primary RAT system 100 in more detail. As shown, the access point 110 and the access terminal 120 may each generally include a wireless communication device (represented by the communication devices 1330 and 1350) for communicating with other wireless nodes via at least one designated RAT. The communication devices 1330 and 1350 may be variously configured for transmitting and encoding signals, and, conversely, for receiving and decoding signals in accordance with the designated RAT (e.g., messages, indications, information, pilots, and so on).

The communication devices 1330 and 1350 may include, for example, one or more transceivers, such as respective primary RAT transceivers 1332 and 1352, and, in some designs, (optional) co-located secondary RAT transceivers 1334 and 1354, respectively (corresponding, for example, to the RAT employed by the competing RAT system 150). As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a radio chip or similar circuitry providing low-level sniffing only). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The access point 110 and the access terminal 120 may also each generally include a communication controller (represented by the communication controllers 1340 and 1360) for controlling operation of their respective communication devices 1330 and 1350 (e.g., directing, modifying, enabling, disabling, etc.). The communication controllers 1340 and 1360 may include one or more processors 1342 and 1362, and one or more memories 1344 and 1364 coupled to the processors 1342 and 1362, respectively. The memories 1344 and 1364 may be configured to store data, instructions, or a combination thereof, either as on-board cache memory, as separate components, a combination, etc. The processors 1342 and 1362 and the memories 1344 and 1364 may be standalone communication components or may be part of the respective host system functionality of the access point 110 and the access terminal 120.

It will be appreciated that the random access channel manager 112 and the random access channel manager 122 may be implemented in different ways. In some designs, some or all of the functionality associated therewith may be implemented by or otherwise at the direction of at least one processor (e.g., one or more of the processors 1342 and/or one or more of the processors 1362), at least one memory (e.g., one or more of the memories 1344 and/or one or more of the memories 1364), at least one transceiver (e.g., one or more of the transceivers 1332 and 1334 and/or one or more of the transceivers 1352 and 1354), or a combination thereof. In other designs, some or all of the functionality associated therewith may be implemented as a series of interrelated functional modules.

Accordingly, it will be appreciated that the components in FIG. 13 may be used to perform operations described above with respect to FIGS. 1-12. For example, the access terminal 120 receive, via the primary RAT transceiver 1352, a broadcast message including information associated with a PRACH on one or more subframes in a portion configured for downlink signaling. The broadcast message may comprise a contention type indicator, a timing advance indicator, or a combination thereof. The access terminal 120 may then determine, via the processor 1362 and the memory 1364, whether contention is in effect for transmission on the PRACH based on the contention type indicator, whether an uplink transmission offset is in effect for transmission on the PRACH based on the timing advance indicator, or a combination thereof. Based on the determining, the access terminal 120 may transmit, via the primary RAT transceiver 1352, signaling over the PRACH on one or more subframes in a portion configured for uplink signaling.

As another example, the access point 110 may set, via the processor 1342 and the memory 1344, a contention type indicator to indicate whether contention is in effect for transmission on a PRACH, a timing advance indicator to indicate whether an uplink transmission offset is in effect for transmission on the PRACH, or a combination thereof. The access point 110 may then transmit, via the primary RAT transceiver 1332, a broadcast message associated with the PRACH on one or more subframes in a portion configured for downlink signaling. The broadcast message may comprise the contention type indicator, the timing advance indicator, or a combination thereof. The access point 110 may receive, via the primary RAT transceiver 1332, signaling over the PRACH on one or more subframes in a portion configured for uplink signaling.

Figure 14:
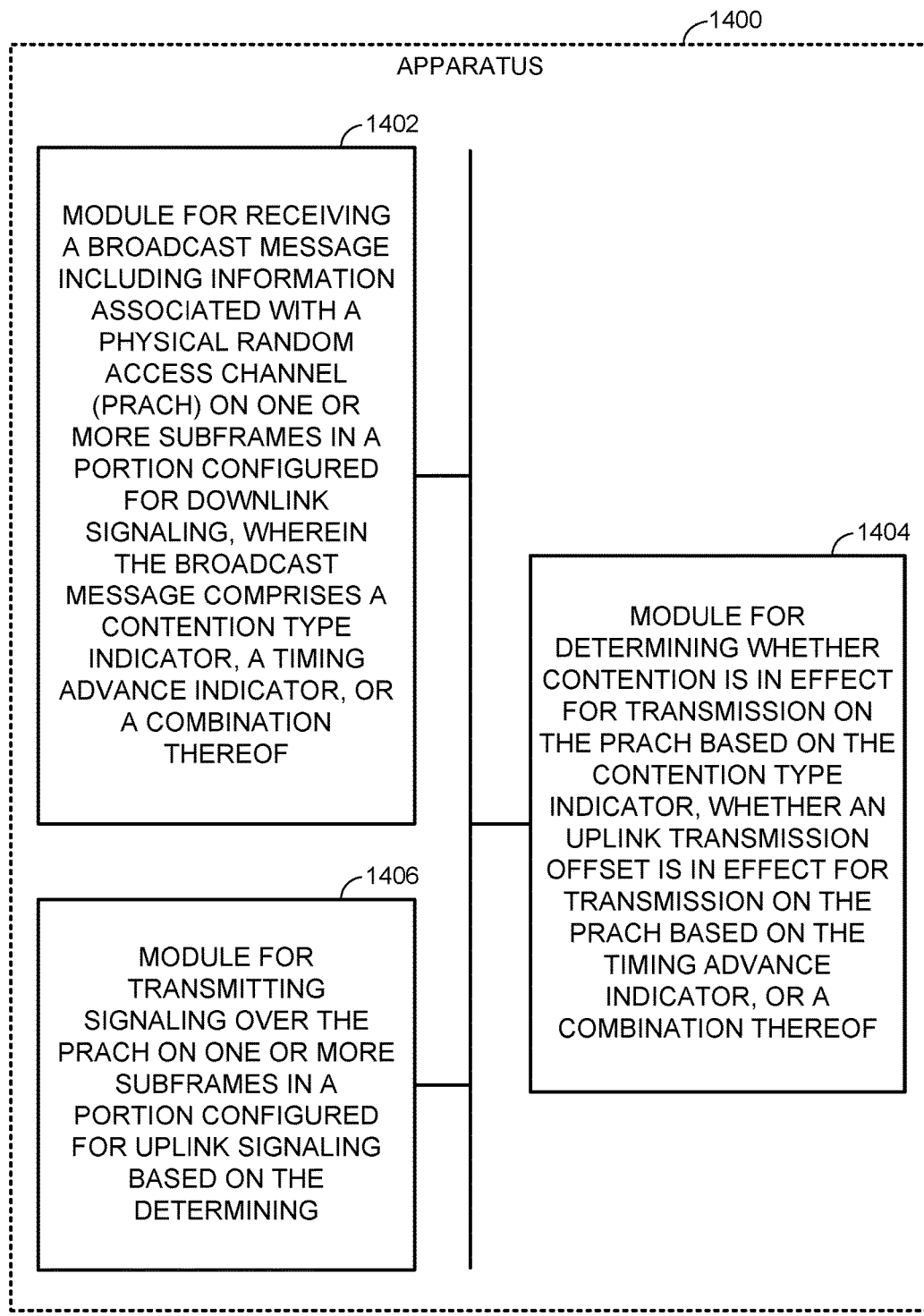
FIG. 14 illustrates an example apparatus represented as a series of interrelated functional modules.

FIG. 14 illustrates an example apparatus for implementing the random access channel manager 122 represented as a series of interrelated functional modules. In the illustrated example, the apparatus 1400 includes a module for receiving 1402, a module for determining 1404, and a module for transmitting 1406.

The module for receiving 1402 may receive a broadcast message including information associated with a PRACH on one or more subframes in a portion configured for downlink signaling. The broadcast message may comprise a contention type indicator, a timing advance indicator, or a combination thereof. The module for determining 1404 may determine whether contention is in effect for transmission on the PRACH based on the contention type indicator, whether an uplink transmission offset is in effect for transmission on the PRACH based on the timing advance indicator, or a combination thereof. Based on the determining, the module for transmitting 1406 may transmit signaling over the PRACH on one or more subframes in a portion configured for uplink signaling.

Figure 15:
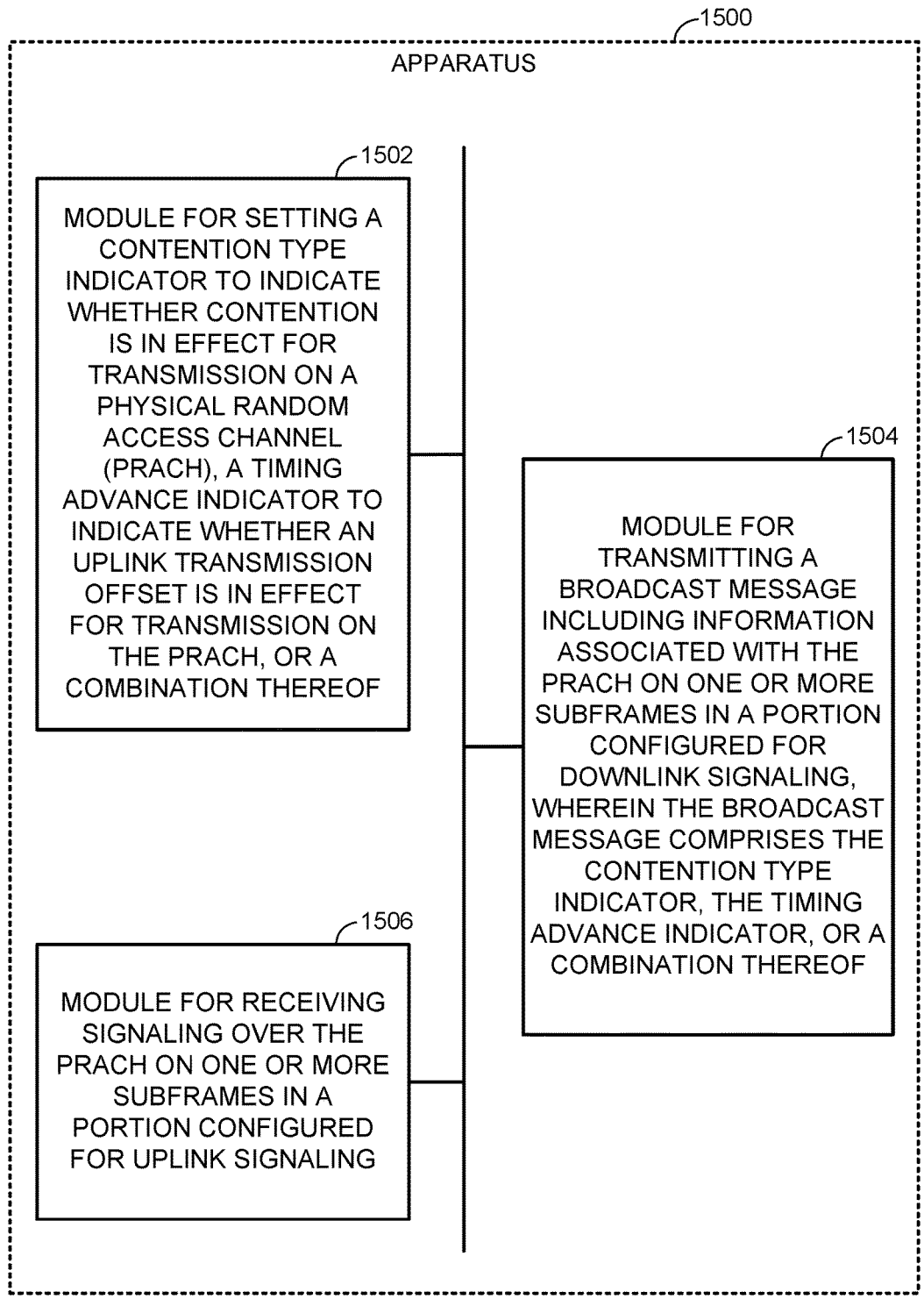
FIG. 15 illustrates another example apparatus represented as a series of interrelated functional modules.

FIG. 15 illustrates an example apparatus for implementing the random access channel manager 112 represented as a series of interrelated functional modules. In the illustrated example, the apparatus 1500 includes a module for setting 1502, a module for transmitting 1504, and a module for receiving 1506.

The module for setting 1502 may set a contention type indicator to indicate whether contention is in effect for transmission on a PRACH, a timing advance indicator to indicate whether an uplink transmission offset is in effect for transmission on the PRACH, or a combination thereof. The module for transmitting 1504 may transmit a broadcast message associated with the PRACH on one or more subframes in a portion configured for downlink signaling. The broadcast message may comprise the contention type indicator, the timing advance indicator, or a combination thereof. The module for receiving 1506 may receive signaling over the PRACH on one or more subframes in a portion configured for uplink signaling.

The functionality of the modules of FIGS. 14-15 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 14-15, as well as other components and functions described herein, may be implemented using any suitable means. Such means also may be implemented, at least in part, using corresponding structure as taught herein. For example, the components described above in conjunction with the "module for" components of FIGS. 14-15 also may correspond to similarly designated "means for" functionality. Thus, in some aspects one or more of such means may be implemented using one or more of processor components, integrated circuits, or other suitable structure as taught herein, including as an algorithm. One skilled in the art will recognize in this disclosure an algorithm represented in the prose described above, as well in sequences of actions that may be represented by pseudocode. For example, the components and functions represented by FIGS. 14-15 may include code for performing a LOAD operation, a COMPARE operation, a RETURN operation, an IF-THEN-ELSE loop, and so on.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A communication method, comprising:
    receiving a broadcast message including information associated with a Physical Random Access Channel (PRACH) on one or more subframes in a portion configured for downlink signaling, wherein the broadcast message comprises a contention type indicator, a timing advance indicator, or a combination thereof;
    determining
        whether contention is in effect for transmission on the PRACH based on the contention type indicator when the broadcast message comprises the contention type indicator,
        whether an uplink transmission offset is in effect for transmission on the PRACH based on the timing advance indicator when the broadcast message comprises the timing advance indicator, or
        a combination thereof;
    transmitting signaling over the PRACH on one or more subframes in a portion configured for uplink signaling based on the determining; and
    receiving a PRACH-specific maximum transmission power parameter for a narrowband PRACH waveform that sets a different maximum transmission power than a Physical Uplink Shared Channel (PUSCH),
    wherein the broadcast message is received on a shared communication medium and the signaling is transmitted on the shared communication medium, the shared communication medium being shared by devices of multiple radio access technologies (RATs).

2. The method of claim 1, further comprising configuring an access terminal for single transmission or autonomous retransmission of a Radio Resource Control (RRC) request message as part of a random access procedure.

3. The method of claim 1, wherein the shared communication medium is an unlicensed frequency band.

4. A communication apparatus, comprising:
    at least one transceiver configured to receive a broadcast message including information associated with a Physical Random Access Channel (PRACH) on one or more subframes in a portion configured for downlink signaling, wherein the broadcast message comprises a contention type indicator, a timing advance indicator, or a combination thereof;
    at least one processor; and
    at least one memory coupled to the at least one processor,
    wherein the at least one processor and the at least one memory are configured to determine
        whether contention is in effect for transmission on the PRACH based on the contention type indicator when the broadcast message comprises the contention type indicator,
        whether an uplink transmission offset is in effect for transmission on the PRACH based on the timing advance indicator when the broadcast message comprises the timing advance indicator, or
        a combination thereof,
    wherein the at least one transceiver is further configured to transmit signaling over the PRACH on one or more subframes in a portion configured for uplink signaling based on the determining,
    wherein the at least one transceiver is further configured to receive a PRACH-specific maximum transmission power parameter for a narrowband PRACH waveform that sets a different maximum transmission power than a Physical Uplink Shared Channel (PUSCH), and
    wherein the broadcast message is received on a shared communication medium and the signaling is transmitted on the shared communication medium, the shared communication medium being shared by devices of multiple radio access technologies (RATs).

5. The apparatus of claim 4, wherein the shared communication medium is an unlicensed frequency band.

6. A non-transitory computer-readable medium comprising code, which, when executed by at least one processor, causes the at least one processor to perform operations for communication, the non-transitory computer-readable medium comprising:
    code for receiving a broadcast message including information associated with a Physical Random Access Channel (PRACH) on one or more subframes in a portion configured for downlink signaling, wherein the broadcast message comprises a contention type indicator, a timing advance indicator, or a combination thereof;

code for determining
    whether contention is in effect for transmission on the PRACH based on the contention type indicator when the broadcast message comprises the contention type indicator,
    whether an uplink transmission offset is in effect for transmission on the PRACH based on the timing advance indicator when the broadcast message comprises the timing advance indicator, or
    a combination thereof;
code for transmitting signaling over the PRACH on one or more subframes in a portion configured for uplink signaling based on the determining; and
code for receiving a PRACH-specific maximum transmission power parameter for a narrowband PRACH waveform that sets a different maximum transmission power than a Physical Uplink Shared Channel (PUSCH),
wherein the broadcast message is received on a shared communication medium and the signaling is transmitted on the shared communication medium, the shared communication medium being shared by devices of multiple radio access technologies (RATs).

7. The non-transitory computer-readable medium of claim 6, wherein the shared communication medium is an unlicensed frequency band.

8. A communication method, comprising:
receiving a broadcast message including information associated with a Physical Random Access Channel (PRACH) on one or more subframes in a portion configured for downlink signaling, wherein the broadcast message comprises a contention type indicator, a timing advance indicator, or a combination thereof;
determining
    whether contention is in effect for transmission on the PRACH based on the contention type indicator when the broadcast message comprises the contention type indicator,
    whether an uplink transmission offset is in effect for transmission on the PRACH based on the timing advance indicator when the broadcast message comprises the timing advance indicator, or
    a combination thereof;
transmitting signaling over the PRACH on one or more subframes in a portion configured for uplink signaling based on the determining; and
receiving a PRACH-specific maximum transmission power parameter for a narrowband PRACH waveform that sets a different maximum transmission power than a Physical Uplink Shared Channel (PUSCH).

9. The method of claim 8, wherein when the broadcast message comprises the contention type indicator, the transmitting comprises selectively contending for access to a shared communication medium for the signaling based on the determining with respect to the contention type indicator.

10. The method of claim 8, wherein when the broadcast message comprises the timing advance indicator, the transmitting is performed at a modified start time with respect to a subframe boundary based on the determining with respect to the timing advance indicator.

11. The method of claim 8, wherein the PRACH corresponds to
    (i) a long PRACH format that occupies all of symbol periods associated with a given subframe, or
    (ii) a short PRACH format that occupies a subset of less than all of symbol periods associated with a given subframe.

12. The method of claim 8, wherein the broadcast message further comprises a Clear Channel Assessment (CCA) threshold indicator, a CCA duration indicator, or a combination thereof.

13. The method of claim 8,
    wherein the portion configured for uplink signaling is located at an end of a subframe configured for PRACH transmission, and
    wherein the transmitting is performed without determining whether the subframe configured for PRACH transmission corresponds to an uplink subframe type, a downlink subframe type, or a special subframe type.

14. The method of claim 8,
    wherein the portion configured for uplink signaling is located at a beginning of a subframe configured for PRACH transmission, and
    wherein the transmitting is performed without determining whether the subframe configured for PRACH transmission corresponds to an uplink subframe type, a downlink subframe type, or a special subframe type.

15. The method of claim 8, further comprising receiving a format/duration indicator, an interlaces indicator, a sequences indicator, a PRACH location/duration indicator, or a combination thereof, in the broadcast message or in a separate broadcast message.

16. The method of claim 8, wherein the PRACH comprises one or more Resource Blocks (RBs) across one or more symbol periods that are reserved for opportunistic transmission following a blocked transmission opportunity.

17. The method of claim 8, further comprising transmitting, for different symbol periods within the PRACH or for different PRACH attempts, a random access preamble from an allocated set of Demodulation Reference Signal (DMRS) sequences, the random access preamble corresponding to a second DMRS sequence that is
    (i) identical to a first DMRS sequence,
    (ii) completely different from a first DMRS sequence, or
    (iii) a cyclically shifted version of a first DMRS sequence.

18. The method of claim 8, further comprising transmitting a Random Access Network Temporary Identifier (RA-RNTI) that is a function of a subframe index, a Resource Block (RB) interlace, a Demodulation Reference Signal (DMRS) sequence employed for the PRACH, or a combination thereof.

19. The method of claim 8, wherein when the contention type indicator and the timing advance indicator are received, both are received in the broadcast message.

20. The method of claim 8, wherein when the contention type indicator is received, the contention type indicator indicates that Listen Before Talk (LBT) is required for access to a shared communication medium.

21. A communication apparatus, comprising:
at least one transceiver configured to receive a broadcast message including information associated with a Physical Random Access Channel (PRACH) on one or more subframes in a portion configured for downlink signaling, wherein the broadcast message comprises a contention type indicator, a timing advance indicator, or a combination thereof;
at least one processor; and
at least one memory coupled to the at least one processor, wherein the at least one processor and the at least one memory are configured to determine
    whether contention is in effect for transmission on the PRACH based on the contention type indicator when the broadcast message comprises the contention type indicator, whether an uplink transmission offset is in effect for transmission on the PRACH based on the timing advance indicator when the broadcast message comprises the timing advance indicator, or a combination thereof, wherein the at least one transceiver is further configured to transmit signaling over the PRACH on one or more subframes in a portion configured for uplink signaling based on the determining, and wherein the at least one transceiver is further configured to receive a PRACH-specific maximum transmission power parameter for a narrowband PRACH waveform that sets a different maximum transmission power than a Physical Uplink Shared Channel (PUSCH).

22. The apparatus of claim 21, wherein when the broadcast message comprises the contention type indicator, the at least one transceiver is further configured to selectively contend for access to a shared communication medium for the signaling based on the determining with respect to the contention type indicator.

23. The apparatus of claim 21, wherein when the broadcast message comprises the timing advance indicator, the at least one transceiver is further configured to transmit the signaling at a modified start time with respect to a subframe boundary based on the determining with respect to the timing advance indicator.

24. The apparatus of claim 21, wherein the PRACH corresponds to
(i) a long PRACH format that occupies all of symbol periods associated with a given subframe, or
(ii) a short PRACH format that occupies a subset of less than all of symbol periods associated with a given subframe.

25. The apparatus of claim 21, wherein the broadcast message further comprises a Clear Channel Assessment (CCA) threshold indicator, a CCA duration indicator, or a combination thereof.

26. The apparatus of claim 21,
wherein the portion configured for uplink signaling is located at an end of a subframe configured for PRACH transmission, and
wherein the at least one transceiver is further configured to transmit the signaling over the PRACH without the at least one processor and the at least one memory determining whether the subframe configured for PRACH transmission corresponds to an uplink subframe type, a downlink subframe type, or a special subframe type.

27. The apparatus of claim 21,
wherein the portion configured for uplink signaling is located at a beginning of a subframe configured for PRACH transmission, and
wherein the at least one transceiver is further configured to transmit the signaling over the PRACH without the at least one processor and the at least one memory determining whether the subframe configured for PRACH transmission corresponds to an uplink subframe type, a downlink subframe type, or a special subframe type.

28. The apparatus of claim 21, wherein the at least one transceiver is further configured to receive a format/duration indicator, an interlaces indicator, a sequences indicator, a PRACH location/duration indicator, or a combination thereof, in the broadcast message or in a separate broadcast message.

29. The apparatus of claim 21, wherein the PRACH comprises one or more Resource Blocks (RBs) across one or more symbol periods that are reserved for opportunistic transmission following a blocked transmission opportunity.

30. The apparatus of claim 21, wherein the at least one transceiver is further configured to transmit, for different symbol periods within the PRACH or for different PRACH attempts, a random access preamble from an allocated set of Demodulation Reference Signal (DMRS) sequences, the random access preamble corresponding to a second DMRS sequence that is
(i) identical to a first DMRS sequence,
(ii) completely different from a first DMRS sequence, or
(iii) a cyclically shifted version of a first DMRS sequence.

31. The apparatus of claim 21, wherein the at least one transceiver is further configured to transmit a Random Access Network Temporary Identifier (RA-RNTI) that is a function of a subframe index, a Resource Block (RB) interlace, a Demodulation Reference Signal (DMRS) sequence employed for the PRACH, or a combination thereof.

32. The apparatus of claim 21, wherein the at least one processor and the at least one memory are further configured to configure an access terminal for single transmission or autonomous retransmission of a Radio Resource Control (RRC) request message as part of a random access procedure.

33. The apparatus of claim 21, wherein when the contention type indicator and the timing advance indicator are received, both are received in the broadcast message.

34. The apparatus of claim 21, wherein when the contention type indicator is received, the contention type indicator indicates that Listen Before Talk (LBT) is required for access to a shared communication medium.

35. A non-transitory computer-readable medium comprising code, which, when executed by at least one processor, causes the at least one processor to perform operations for communication, the non-transitory computer-readable medium comprising:
code for receiving a broadcast message including information associated with a Physical Random Access Channel (PRACH) on one or more subframes in a portion configured for downlink signaling, wherein the broadcast message comprises a contention type indicator, a timing advance indicator, or a combination thereof;
code for determining
whether contention is in effect for transmission on the PRACH based on the contention type indicator when the broadcast message comprises the contention type indicator,
whether an uplink transmission offset is in effect for transmission on the PRACH based on the timing advance indicator when the broadcast message comprises the timing advance indicator, or
a combination thereof;
code for transmitting signaling over the PRACH on one or more subframes in a portion configured for uplink signaling based on the determining, and
code for receiving a PRACH-specific maximum transmission power parameter for a narrowband PRACH waveform that sets a different maximum transmission power than a Physical Uplink Shared Channel (PUSCH).

36. The non-transitory computer-readable medium of claim 35, wherein when the broadcast message comprises the contention type indicator, the code for transmitting comprises code for selectively contending for access to a shared communication medium for the signaling based on the determining with respect to the contention type indicator.

37. The non-transitory computer-readable medium of claim 35, wherein when the broadcast message comprises the timing advance indicator, the code for transmitting comprises code for transmitting the signaling at a modified start time with respect to a subframe boundary based on the determining with respect to the timing advance indicator.

38. The non-transitory computer-readable medium of claim 35, wherein the broadcast message further comprises a Clear Channel Assessment (CCA) threshold indicator, a CCA duration indicator, or a combination thereof.

39. The non-transitory computer-readable medium of claim 35, further comprising code for receiving a format/duration indicator, an interlaces indicator, a sequences indicator, a PRACH location/duration indicator, or a combination thereof, in the broadcast message or in a separate broadcast message.

40. The non-transitory computer-readable medium of claim 35, wherein when the contention type indicator and the timing advance indicator are received, both are received in the broadcast message.

41. The non-transitory computer-readable medium of claim 35, wherein when the contention type indicator is received, the contention type indicator indicates that Listen Before Talk (LBT) is required for access to a shared communication medium.

* * * * *